United States Patent
Katayama et al.

(10) Patent No.: US 8,330,913 B2
(45) Date of Patent: Dec. 11, 2012

(54) LIQUID CRYSTAL DISPLAY DEVICE

(75) Inventors: Takashi Katayama, Osaka (JP);
Masahiro Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 159 days.

(21) Appl. No.: 12/993,373

(22) PCT Filed: Mar. 26, 2009

(86) PCT No.: PCT/JP2009/056046
§ 371 (c)(1),
(2), (4) Date: Nov. 18, 2010

(87) PCT Pub. No.: WO2010/001647
PCT Pub. Date: Jan. 7, 2010

(65) Prior Publication Data
US 2011/0075082 A1  Mar. 31, 2011

(30) Foreign Application Priority Data

Jun. 30, 2008 (JP) ................................. 2008-171222

(51) Int. Cl.
*G02F 1/1337* (2006.01)
*G02F 1/139* (2006.01)

(52) U.S. Cl. ........ 349/123; 349/126; 349/143; 349/146; 349/177

(58) Field of Classification Search .................. 349/123, 349/126, 143, 146, 167, 177, 132; 345/87, 345/92
See application file for complete search history.

(56) References Cited

U.S. PATENT DOCUMENTS

| | | |
|---|---|---|
| 6,671,009 B1 | 12/2003 | Hatta et al. |
| 2003/0001809 A1 | 1/2003 | Hattori et al. |
| 2004/0160396 A1 | 8/2004 | Hattori et al. |
| 2005/0052399 A1 | 3/2005 | Hattori et al. |
| 2007/0121027 A1* | 5/2007 | Lee et al. ............... 349/61 |
| 2008/0192194 A1* | 8/2008 | Kizu et al. ............. 349/129 |

FOREIGN PATENT DOCUMENTS

| | | |
|---|---|---|
| JP | 2-013927 | 1/1990 |
| JP | 2002-250942 | 9/2002 |

OTHER PUBLICATIONS

International Search Report for PCT/JP2009/056046, mailed Jun. 2, 2009.

* cited by examiner

*Primary Examiner* — Dung Nguyen
*Assistant Examiner* — Tai Duong
(74) *Attorney, Agent, or Firm* — Nixon & Vanderhye P.C.

(57) ABSTRACT

A first substrate (20) is subjected to an alignment treatment for controlling an alignment direction of liquid crystal molecules of a liquid crystal layer, an alignment control region (R60) is provided in at least a part of a Y-direction interelectrode region (R52) between respective adjacent pixel electrodes (60), and an extension direction (D10) of the alignment control region (R60) is at an angle of not less than −15° and not more than +15° with a direction in which the alignment treatment is carried out (D20).

12 Claims, 16 Drawing Sheets

LIQUID CRYSTAL DISPLAY DEVICE

This application is the U.S. national phase of International Application No. PCT/JP2009/056046 filed 26 Mar. 2009, which designated the U.S. and claims priority to JP Application No. 2008-171222 filed 30 Jun. 2008, the entire contents of each of which are hereby incorporated by reference.

TECHNICAL FIELD

The present invention relates to a liquid crystal display device having an OCB (Optically Self-Compensated Birefringence type) liquid crystal display panel.

BACKGROUND ART

Conventionally, a liquid crystal display device has been used in various electronic devices such as a television set, a laptop PC (Personal Computer), a desktop PC, a PDA (Personal Digital Assistant: a mobile terminal), and a mobile phone. This is because the liquid crystal display device has the following advantages: (i) it is thinner and lighter than a CRT (Cathode Ray Tube)-based display and (ii) it can be driven at a low voltage, and (iii) it can realize lower power consumption.

A liquid crystal display device in which TFT (Thin Film Transistor) elements are used (a TFT liquid crystal display device) realizes a high display quality since all pixels are switched via respective TFT elements.

Meanwhile, it is rapidly becoming popular to display a moving picture by use of a liquid crystal display device in a television receiver or the like. In view of the circumstances, it is necessary to further increase a response speed of a liquid crystal display panel in the liquid crystal display device so that a moving picture can be finely displayed.

Against a backdrop of this, it is a liquid crystal display device having an OCB (Optically Self-Compensated Birefringence type) liquid crystal display panel that has recently gained particular public attention. The liquid crystal display device having the OCB liquid crystal display panel is generally arranged as follows: Liquid crystal molecules are provided between two substrates each of which is subjected to an alignment treatment which causes the liquid crystal molecules to be aligned in parallel to each other and in an identical direction. Wave plates are provided on respective surfaces of the two substrates. Polarizing plates are further provided on the respective two substrates so as to be in a crossed Nicols relationship between the polarizing plates.

(Reverse Transition)

For example, assume that the OCB liquid crystal display panel is used in a normally white mode (hereinafter referred to as an NW mode) in which a black display is carried out during high voltage application and a white display is carried out during low voltage application. In order to realize a white display having a high transmittance, it is necessary to apply a voltage to a liquid crystal layer, which is substantially reduced to a critical voltage (Vcr) at which a transition occurs from a splay alignment to a bend alignment (a splay-to-bend alignment).

Therefore, a transition may occur, during a white display, from the bend alignment to the splay alignment (a bend-to-splay transition) (hereinafter referred to as a reverse transition) in which a splay alignment state of liquid crystal molecules that has been once changed to a bend alignment state is reversed to the splay alignment again. This causes prevention of an appropriate display.

The reverse transition also occurs in a case where a liquid crystal display device is driven by a voltage which is not less than the critical voltage (Vcr). In case of a TFT liquid crystal display device, the reverse transition may occur in a gap between respective pixel electrodes provided above both a gate bus line and a source bus line. In such a case, a splay alignment region of the bus line and a splay alignment region of the source bus line are easy to be combined.

In such a state, the splay alignment region may intrude into a display region during a white display. This will cause a display defect.

(High White Voltage)

Various methods for preventing the reverse transition have been suggested.

For example, a method has been suggested in which a voltage (hereinafter referred to as a white voltage) applied during a white display in the normally white mode is sufficiently higher than the critical voltage (Vcr).

However, according to the method in which the white voltage is increased, it is difficult to realize a high-brightness OCB panel. This is because there is a trade-off between an increased white voltage and a brightness.

(Black Insertion)

Note that, for preventing the reverse transition, another method has been suggested in which a signal for preventing the reverse transition which signal is different from an image signal is applied.

Specifically, for example, a method has been suggested in which a black display is inserted (a black insertion is carried out) at least one time within one (1) frame of an image display so as to stably retain the bend alignment.

However, the method employing the black insertion has caused a problem of deteriorating a white brightness, which is similar to the method employing the high white voltage.

There has also been a problem that the black insertion causes a flicker.

(Patent Literature 1)

Patent Literature 1 describes an arrangement in which a protruded part is provided, in a circumferential part of a pixel of a plane which is parallel to a substrate plane so that liquid crystal molecules as a whole are efficiently subjected to the transition to the bend alignment. This will be described below with reference to the drawing.

FIG. 14 schematically illustrates a liquid crystal display device 100 described in Patent Literature 1. The liquid crystal display device 100 described in Patent Literature 1 includes a plurality of signal electrode lines 106 and a plurality of gate electrode lines 107 which cross at substantially right angles to the plurality of signal electrode lines 107 (see FIG. 14).

Pixel electrodes 102 which are substantially rectangular are provided in respective pixel regions which are substantially defined by the plurality of signal electrode lines 106 and the plurality of gate electrode lines 107. Each of the pixel electrodes 102 is connected to a switching transistor 108, which is provided in a vicinity of each of intersections of the plurality of signal electrode lines 106 and the plurality of gate electrode lines 107.

According to the liquid crystal display device 100 described in Patent Literature 1, a signal electrode line 106 has a protruded part 161. A pixel electrode 102 has a depressed part 121 which is provided so as to correspond to a shape of the protruded part 161 and so as to face the protruded part 161.

The pixel electrode 102 has a protruded part 122 whose shape is similar to that of the protruded part 161 of the signal electrode line 106. A signal electrode line 106 has a depressed part 162 which is provided so as to correspond to a shape of the protruded part 122 and so as to face the protruded part 122.

Patent Literature 1 describes that, according to the arrangement, the liquid crystal molecules as a whole are efficiently subjected to the transition to the bend alignment.

Patent Literature 1

Japanese Patent Application Publication, Tokukai, No. 2002-250942 A (Publication Date: Sep. 6, 2002)

SUMMARY OF INVENTION

However, the conventional liquid crystal display device causes a problem of insufficiently preventing the reverse transition.

Namely, Patent Literature 1 describes that, since the liquid crystal display device 100 causes transverse electric fields generated in the convexities 122 and 161 and the concavities 121 and 162 to serve as transition nuclei of the splay-to-bend alignment, it is possible to comparatively prompt completion of the splay-to-bend transition as a whole. However, it is difficult for the liquid crystal display device 100 to sufficiently prevent an occurrence of the reverse transition, for example, during an actual display carried out after the transition to the bend alignment. This will be described below with reference to the drawings.

(Arrangement of OCR Panel)

First of all, the following description discusses (i) a schematic arrangement of a liquid crystal display device having an OCR liquid crystal display panel and (ii) an alignment of liquid crystal molecules, with reference to (a) of FIG. 15 and (b) of FIG. 15.

(a) of FIG. 15 and (b) of FIG. 15 are schematic cross-sectional views each illustrating an arrangement of a liquid crystal display device 10 having the OCR liquid crystal display panel. (a) of FIG. 15 illustrates how liquid crystal molecules 52 are aligned during no voltage application, whereas (b) of FIG. 15 illustrates how the liquid crystal molecules 52 are aligned during voltage application.

According to the liquid crystal display device 10, a liquid crystal layer 50 including the liquid crystal molecules 52 is provided between a first substrate 20 and a second substrate 30 (see (a) of FIG. 15 and (b) of FIG. 15).

Specifically, the first substrate 20, on which (i) a wiring layer 22 including bus lines, switching elements, and the like, (ii) an insulating layer 24, (iii) pixel electrodes 60, and (iv) a first alignment film 26 are provided, serves as a TFT substrate (an active matrix substrate).

The second substrate 30, on which a color filter 32, a counter electrode 34, and a second alignment film 36 are provided, serves as a counter substrate.

Furthermore, a first optical compensation film (wave plate) 54 and a first polarizing plate 55 are provided on a surface of the first substrate 20 which surface is opposite to a surface on which the wiring layer 22 is provided. A second optical compensation film (wave plate) 56 and a second polarizing plate 57 are provided on a surface of the second substrate 30 which surface is opposite to a surface on which the color filter 32 is provided.

More specifically, each of the first alignment film 26 and the second alignment film 36 is subjected to an alignment treatment by rubbing (a rubbing alignment treatment). As described later, the alignment treatment is carried out by rubbing, in an identical direction, the surfaces of the two substrates (the TFT substrate and the counter substrate) which surfaces face each other so that the liquid crystal molecules 52 are in the splay alignment state during no voltage application, whereas the liquid crystal molecules 52 are in the bend alignment state during voltage application.

Further, the polarizing plates (the first polarizing plate 55 and the second polarizing plate 57) which are attached to respective surfaces of the two substrates are arranged so that their optical axes are at respective angles of 45° and 135° (are in a crossed Nicols relationship) with respective alignment directions of the liquid crystal molecules 52 on the surfaces of the respective substrates, that is, with a direction in which the rubbing alignment treatment is carried out.

Each of the liquid crystal molecules 52 included in the liquid crystal layer 50 generally has a positive dielectric anisotropy. Note here that a liquid crystal molecule 52 having a positive dielectric anisotropy refers to the one which has a characteristic in which, while a voltage is being applied to the liquid crystal molecule 52, a major axis direction of the liquid crystal molecule 52 is parallel to an electric field generated by the voltage.

Note that the first substrate 20 and the second substrate 30 are combined by use of spherical spacers or columnar spacers (not illustrated) so as to be away, by a predetermined distance, from each other.

(Alignments of Liquid Crystal Molecules)

The following description specifically discusses alignments of the liquid crystal molecules 52 in the OCB liquid crystal display panel. The liquid crystal display device 10 having the OCB liquid crystal display panel is arranged such that: the liquid crystal molecules 52 are in the splay alignment state during no voltage application (see (a) of FIG. 15), whereas, during voltage application, the splay alignment is changed to the bend alignment (this change is referred to as the splay-to-bend transition) (see (b) of FIG. 15). Then, display is carried out during the bend alignment by changing tilt angles of the respective liquid crystal molecules 52.

More specifically, right after the liquid crystal molecules 52 are filled between the first substrate 10 and the second substrate 20, the liquid crystal molecules 52 are in the splay alignment state (in an initial alignment state) in which the liquid crystal molecules 52 are substantially parallel to the first substrate 20 and the second substrate 30 (see (a) of FIG. 15). Note that application of a voltage to the liquid crystal molecules 52 generally causes a transition of the splay alignment state of the liquid crystal molecules 52 to the bend alignment state. Namely, in a case where a relatively high voltage (e.g. 25V) is applied to the liquid crystal molecules 52 which are in the splay alignment state, the liquid crystal molecules 52 are aligned in a direction perpendicular to the first substrate 20 and the second substrate 30. In other words, the liquid crystal molecules 52 are caused to be at more right angles with the two substrates. This causes the transition to the bend alignment, so that the splay alignment state of the liquid crystal molecules 52 provided in a display surface is gradually changed to the bend alignment state (see (b) of FIG. 15).

As described earlier, an actual display is carried out in the bend alignment state in the liquid crystal display device 10 having the OCB liquid crystal display panel. Therefore, it is necessary that the splay-to-bend transition occur every time the liquid crystal display device 10 is turned on.

In order to subject the liquid crystal display layer 50 to an active matrix driving, TFT (Thin Film Transistor) elements are provided as switching elements in respective pixels. Each of the TFT elements is connected to a corresponding gate bus line and a corresponding source bus line. An arrangement of these members is to be described later.

(Actual Display)

As described earlier, an actual display is carried out after the splay-to-bend transition has been completed, that is, in the bend alignment state. Generally, an inversion driving by use of the TFT elements such as a line inversion driving or a dot inversion driving is carried out during display. FIG. 16, which shows a state of liquid crystal molecules during display, is a cross-sectional view of a liquid crystal display device.

Liquid crystal molecules 52 are in the bend alignment state during display and tilt angles of the respective liquid crystal molecules 52 change depending on a voltage applied to the liquid crystal molecules 52 (see FIG. 16).

For example, to the liquid crystal molecules 52 corresponding to a pixel electrode 60 (a reference pixel electrode 60a) of FIG. 16, a voltage equivalent to a difference between an electric potential V1 of the reference pixel electrode 60a and an electric potential Vcom of the counter electrode 34 is applied.

Similarly, to the liquid crystal molecules 52 corresponding to a pixel electrode 60 adjacent to the reference pixel electrode 60a (an adjacent pixel electrode 60b), a voltage equivalent to a difference between an electric potential V2 of the adjacent pixel electrode 60b and the electric potential Vcom of the counter electrode 34 is applied.

(Transverse Electric Field)

In a case where adjacent pixel electrodes 60 which are adjacent to each other have different electric potentials, a transverse electric field is generated between the pixel electrodes 60.

Namely, an interpixel transverse electric field (see an arrow DV of FIG. 16) due to a difference between the electric potential V1 and the electric potential V2 (V1-V2) is generated between the reference pixel electrode 60a and the adjacent pixel electrode 60b (see the example shown in FIG. 16).

Such an interpixel transverse electric field is generated not only between pixel electrodes 60, between which a gate bus line is provided but also between pixel electrodes 60, between which a source bus line is provided. However, in a case where the liquid crystal display device 10 is subjected to the line inversion driving, a larger transverse electric field is generated between the pixel electrodes 60, between which the gate bus line is provided than between the pixel electrodes 60, between which the source bus line is provided. The following description discusses this point with reference to the drawing.

(Pixel Arrangement)

FIG. 17 is a drawing illustrating an arrangement of pixels and wires of a liquid crystal display device 10 which is subjected to the active matrix driving, more specifically to the line inversion driving by TFT elements.

A plurality of gate bus lines 40 and a plurality of source bus lines 42 are provided in a matrix pattern in the liquid crystal display device 10 (see FIG. 17).

Specifically, the plurality of gate bus lines 40 extend in a transverse direction (an arrow X direction of FIG. 17), whereas the plurality of source bus lines 42 extend in a vertical direction (an arrow Y direction of FIG. 17) which crosses at right angles to the X direction.

A substantially rectangular region defined by a gate bus line 40 and a source bus line 42 serves as a pixel 58. A pixel electrode 60 is provided in the pixel 58.

As described earlier, pixel electrodes 60 which are adjacent to each other may have different electric potentials during display carried out by the liquid crystal display device 10. A gate bus line 40 or a source bus line 42 may be provided between such pixel electrodes 60 that have different electric potentials.

In a case where pixel electrodes 60, between which a wiring layer 22 such as a gate bus line 40 or a source bus line 42 is provided, have different electric potentials, the interpixel transverse electric field, as shown in FIG. 16, (see the arrow DV of FIG. 16) is generated.

Particularly in a case where the liquid crystal molecules 52 have a positive dielectric anisotropy, the splay alignment is highly likely to be induced by the interpixel transverse electric field (see a splay alignment region RS of FIG. 16).

Namely, in a case where the liquid crystal molecules 52 have a positive dielectric anisotropy, a major axis direction of the liquid crystal molecules 52 is easy to be parallel to an electric field. Therefore, the interpixel transverse electric field easily causes the major axis direction of the liquid crystal molecules 52 to be parallel to the first substrate 20. As a result, the reverse transition to the splay alignment is easy to occur.

(Intrusion into Display Region: Line Inversion Driving)

The splay alignment which has occurred on the wiring layer 22 may intrude into a display region. The following description discusses a splay alignment region expanding during the line inversion driving, with reference to FIG. 17.

As described earlier, in a case where the liquid crystal display device 10 is subjected to the line inversion driving, a larger transverse electric field tends to be generated between pixel electrodes 60, between which a gate bus line 40 is provided than between pixel electrodes 60, between which a source bus line 42 is provided.

This causes the splay alignment to easily occur first in a region between the pixel electrodes 60, between which the gate bus line 40 is provided (an X-direction interelectrode region R50).

For example, the splay alignment which has occurred in the X-direction interelectrode region R50 illustrated in FIG. 17 (see a reverse transition occurrence point PR of FIG. 17) expands not only in a region above the X-direction interelectrode region R50 in an extension direction of the gate bus line 40 (see an arrow D30 and an arrow D34 each illustrated in FIG. 17) but also into a Y-direction interelectrode region R52 above the source bus line 42 (see an arrow D32 illustrated in FIG. 17).

In an intersection region R10 in which the X-direction interelectrode region R50 and the Y-direction interelectrode region R52 intersect, a splay alignment region RS of the X-direction interelectrode region R50 and a splay alignment region RS of the Y-direction interelectrode region R52 tend to shrink themselves up due to a surface tension, such that it will intrude into a display region R20. Accordingly, a corner part R40 of the display region R20, i.e., the pixel 58 becomes a splay alignment region RS.

The splay alignment region RS thus combined is easy to intrude into the display region R20 corresponding to the pixel 58 particularly during, for example, a white display carried out in the normally white mode. This causes an occurrence of the reverse transition to be recognized by a main viewer of the liquid crystal display device 10 and then causes a display defect.

(Location of Intrusion)

Note here that a corner part of four corner parts corresponding to respective angles of the pixel 58 via which corner part the splay alignment region RS is easy to intrude into the display region R20 is decided depending on a direction in which the rubbing alignment treatment is carried out.

Namely, for example, in a case where the rubbing alignment treatment is carried out in a diagonally upper right direction (see an arrow 120 illustrated in FIG. 17), the splay alignment region RS is easy to intrude into the display region R20 via the corner part R40 corresponding to a lower right angle of the four corner parts.

The above description discussed the case in which the splay alignment region RS which has occurred in the X-direction interelectrode region R50 which is a region between the pixel electrodes 60 provided above the gate bus line 40 intrudes into the display region 20. Similarly, the splay alignment region RS which has occurred in the Y-direction interelectrode region R52 which is a region between the pixel electrodes 60 provided above the source bus line 42 intrudes into the display region 20. In this case, the Y-direction interelectrode region R52 expands not only in the Y-direction interelectrode region R52 but also into the X-direction interelectrode region R50 above the gate bus line 40. This causes the splay alignment region RS to intrude into the display region R20.

(Dot Inversion Driving)

Next, the following description discusses a case in which a liquid crystal display device 10 is subjected to the dot inversion driving, with reference to FIG. 18. FIG. 18 schematically illustrates the liquid crystal display device 10 which is subjected to the dot inversion driving.

According to the liquid crystal display device 10 which is subjected to the dot inversion driving, a splay alignment region RS tends to intrude into a display region R20 in a wider range as compared with the case of the liquid crystal display device 10 which is subjected to the line inversion driving.

This is because, according to the dot inversion driving, unlike the case of the line inversion driving, a large transverse electric field is also applied between pixel electrodes 60, between which a source bus line 42 is provided. According to the liquid crystal display device 10 which is subjected to the line inversion driving (as described in FIG. 17), such a large transverse electric field caused the splay alignment region RS to intrude into the display region R20 substantially at one corner part of the four corner parts of the pixel 58. In contrast, the splay alignment region RS intrudes into the display region R20 at two corner parts of a pixel 58 in the liquid crystal display device 10 which is subjected to the dot inversion driving (see FIG. 18).

Specifically, for example, in a case where the rubbing alignment treatment is carried out in a diagonally upper right direction (see FIG. 18), the splay alignment region RS is easy to intrude into the display region R20 at a corner part R40 corresponding to a lower right angle and a corner part R42 corresponding to an upper left angle of the four corner parts.

As described above, the splay alignment region RS intrudes into the display region R20 via two corner parts of the pixel 58 in the liquid crystal display device 10 which is subjected to the dot inversion driving. This causes a problem of a deterioration in display quality due to the reverse transition to be more serious.

The present invention has been made in view of the problems, and its object is to provide a liquid crystal display device which is capable of preventing a deterioration in display quality due to expansion of a reverse transition.

In particular, the object of the present invention is to provide a liquid crystal display device which is capable of preventing a deterioration in display quality by preventing the reverse transition from expanding from interpixel regions and a corresponding intersection of the interpixel regions into a pixel.

Another object of the present invention is to provide a liquid crystal display device which is capable of preventing the reverse transition from expanding while being subjected to the dot inversion driving.

In order to attain the objects, an OCB liquid crystal display device of the present invention includes: a first substrate; a second substrate; and a liquid crystal layer provided between the first substrate and the second substrate, pixels being provided in a matrix pattern, pixel electrodes being provided on the first substrate so as to correspond to the respective pixels, a counter electrode being provided on the second substrate, liquid crystal molecules of the liquid crystal layer having a splay alignment in a state where no voltage is applied to the liquid crystal layer, and a transition occurring to a bend alignment from the splay alignment in response to application of a voltage to the liquid crystal layer, the first substrate being subjected to an alignment treatment for controlling an alignment direction of the liquid crystal molecules of the liquid crystal layer, an alignment control region being provided in at least a part of a region between respective adjacent pixel electrodes, and an extension direction of the alignment control region being at an angle of not less than −15° and not more than +15° with a direction in which the alignment treatment is carried out.

According to the arrangement, the alignment control region in which the extension direction of the alignment control region is at an angle of not less than −15° and not more than +15° with the direction in which the alignment treatment is carried out is provided in the region between the respective pixel electrodes.

Since an angle at which the extension direction of the alignment control region is with the direction in which the alignment treatment is carried out falls within the foregoing range, an electric field is generated, in the alignment control region, in a direction which crosses at substantially right angles to the alignment direction of the liquid crystal molecules. Therefore, a twist alignment is more likely to be induced than the splay alignment.

Note here that the twist alignment is more close to the bend alignment than to the splay alignment in terms of energy. Accordingly, a transition to the bend alignment, rather than a transition to the splay alignment, is more likely to occur in the alignment control region.

Accordingly, since the alignment control region is provided in the OCB liquid crystal display device, the alignment control region can prevent a splay alignment region which may occur due to the reverse transition from expanding.

As a result, according to the arrangement, it is possible to provide a liquid crystal display device which is capable of preventing a deterioration in display quality due to expansion of the reverse transition.

The OCB liquid crystal display device of the present invention is preferably arranged such that the extension direction of the alignment control region is at an angle of not less than −10° and not more than +10° with the direction in which the alignment treatment is carried out.

The OCB liquid crystal display device of the present invention is preferably arranged such that the extension direction of the alignment control region is at an angle of not less than −5° and not more than +5° with the direction in which the alignment treatment is carried out.

The OCB liquid crystal display device of the present invention is preferably arranged such that the extension direction of the alignment control region is identical to the direction in which the alignment treatment is carried out.

According to the arrangement, in the region between the respective pixel electrodes, the alignment direction of the liquid crystal molecules and the direction of the electric field have a relationship which is closer to an orthogonal relationship. Therefore, the twist alignment which is closer to the bend alignment in terms of energy is more likely to be induced.

Accordingly, it is possible to further prevent the splay alignment from occurring and expanding and consequently to further prevent a deterioration in display quality due to expansion of the reverse transition.

The OCB liquid crystal display device of the present invention is preferably arranged such that: each of the pixels is rectangular; and the alignment control region is provided, in at least one corner part of said each of the pixels, between a pixel electrode corresponding to said each of the pixels and a pixel electrode which is adjacent to the pixel electrode corresponding to said each of the pixels.

According to the arrangement, the alignment control region is provided in a corner part of each of the pixels which are provided in the matrix pattern.

Note here that the splay alignment region is easy to intrude into a pixel at an intersection of interelectrode regions which extend in different directions, i.e., in a vicinity of a corner part of the pixel.

In view of the circumstances, according to the arrangement, the alignment control region is provided in a corner part of each of the pixels. Therefore, it is possible to effectively prevent the splay alignment region from intruding into a pixel.

The OCB liquid crystal display device of the present invention is preferably arranged such that the alignment control region includes alignment control regions which are provided, in at least two adjacent corner parts of said each of the pixels, between the pixel electrode corresponding to said each of the pixels and the pixel electrode which is adjacent to the pixel electrode corresponding to said each of the pixels.

According to the arrangement, the alignment control regions are provided in adjacent corner parts of each of the pixels.

Accordingly, for example, in a case where an electric potential difference between pixel electrodes provided in a specific direction is large (e.g., a case where a liquid crystal display device is subjected to an inversion driving such as a line inversion driving), it is possible to more effectively prevent the splay alignment region from intruding into a pixel.

The OCB liquid crystal display device of the present invention is preferably arranged such that the alignment control region includes alignment control regions which are provided, in four corner parts of said each of the pixels, between the pixel electrode corresponding to said each of the pixels and the pixel electrode which is adjacent to the pixel electrode corresponding to said each of the pixels.

According to the arrangement, the alignment control region is provided in respective four corner parts of each of the pixels.

Accordingly, for example, in a case where an electric potential difference between adjacent pixel electrodes in four directions is large (e.g., a case where a liquid crystal display device is subjected to dot inversion driving), it is possible to more effectively prevent the splay alignment region from intruding into a pixel.

The OCB liquid crystal display device of the present invention is preferably arranged such that the alignment control region is provided, in a central part of at least one outer circumferential side of said each of the pixels which is rectangular, between the pixel electrode corresponding to said each of the pixels and the pixel electrode which is adjacent to the pixel electrode corresponding to said each of the pixels.

According to the arrangement, the alignment control region is provided in a central part of an outer circumferential side of each of the pixels.

Accordingly, for example, in a case where the splay alignment region has a larger width (e.g., a case where the splay alignment region due to the reverse transition elliptically expands between the pixel electrodes), it is possible to more effectively prevent the splay alignment region from intruding into a pixel.

The OCB liquid crystal display device of the present invention is preferably arranged such that the alignment treatment is a rubbing alignment treatment.

According to the arrangement, it is possible to cause the rubbing alignment treatment to simply and easily and securely control the alignment direction of the liquid crystal molecules.

The OCB liquid crystal display device of the present invention is preferably arranged such that the direction in which the alignment treatment is carried out is at an angle of not less than +40° and not more than +50° with a direction in which the pixels are provided in the matrix pattern.

According to the arrangement, an angle at which the direction in which the alignment treatment is carried out is with the direction in which the pixels are provided is close to 45°. Accordingly, it is possible to provide a liquid crystal display device characterized by an excellent viewing angle.

The OCB liquid crystal display device of the present invention is preferably arranged such that: the alignment treatment is a rubbing alignment treatment; the direction in which the alignment treatment is carried out is at an angle of not less than +40° and not more than +50° with a direction in which the pixels are provided in the matrix pattern; each of the pixels is rectangular; and the alignment control region is provided, in at least a corner part of said each of the pixels which corner part is first subjected to the rubbing alignment treatment, between a pixel electrode corresponding to said each of the pixels and a pixel electrode which is adjacent to the pixel electrode corresponding to said each of the pixels.

According to the arrangement, the alignment control region is provided in a corner part of each of the pixels which corner part is first subjected to the rubbing alignment treatment. Note here that, since the pixels are provided in the matrix pattern, the alignment control region is relatively identically provided in each of pixels provided in an identical column or an identical line.

Therefore, for example, in a case where a liquid crystal display device is subjected to an active matrix driving, alignment control regions are provided above a bus line which is connected to a corresponding switching element.

Accordingly, especially, for example, in a case where a liquid crystal display device is subjected to the line inversion driving, it is possible to more effectively prevent the splay alignment region due to the reverse transition from intruding into a pixel.

The OCB liquid crystal display device of the present invention is preferably arranged such that an electric field is generated, in the alignment control region, in a direction which is at an angle of not less than −75° and not more than +75° with the alignment direction of the liquid crystal molecules.

The OCB liquid crystal display device of the present invention is preferably arranged such that an electric field is generated, in the alignment control region, in a direction which crosses at substantially right angles to the alignment direction of the liquid crystal molecules.

As described earlier, the OCB liquid crystal display device of the present invention is arranged such that: the first substrate is subjected to an alignment treatment for controlling an alignment direction of the liquid crystal molecules of the liquid crystal layer, an alignment control region is provided in at least a part of a region between respective adjacent pixel electrodes, and an extension direction of the alignment control region is at an angle of not less than −15° and not more than +15° with a direction in which the alignment treatment is carried out.

Accordingly, the present invention brings about an effect of providing a liquid crystal display device which is capable of preventing a deterioration in display quality due to expansion of the reverse transition.

Figure 1:
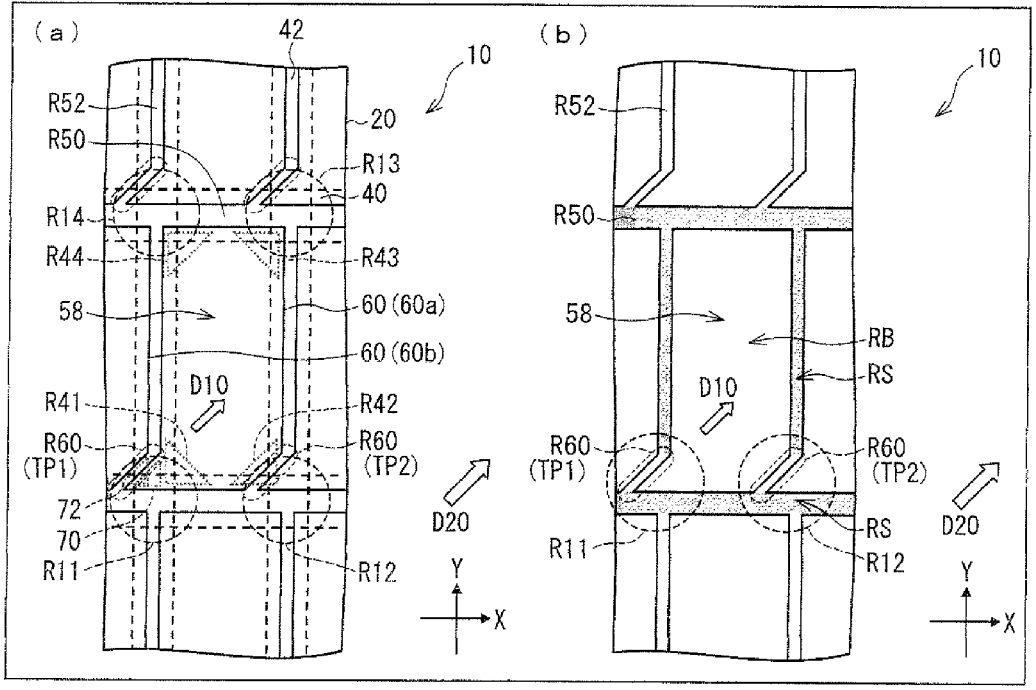
FIG. 1

Each of (a) and (b) of FIG. 1 shows a first embodiment of the present invention. (a) of FIG. 1 schematically illustrates an arrangement of a liquid crystal display device, and (b) of FIG. 1 illustrates an alignment distribution of liquid crystal molecules.

FIG. 2

Figure 2:
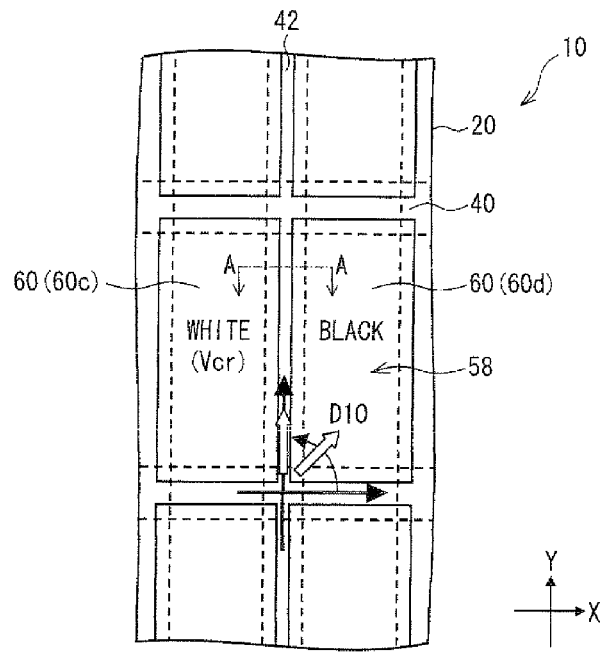

FIG. 2 schematically illustrates the arrangement of the liquid crystal display device.

FIG. 3

Figure 3:
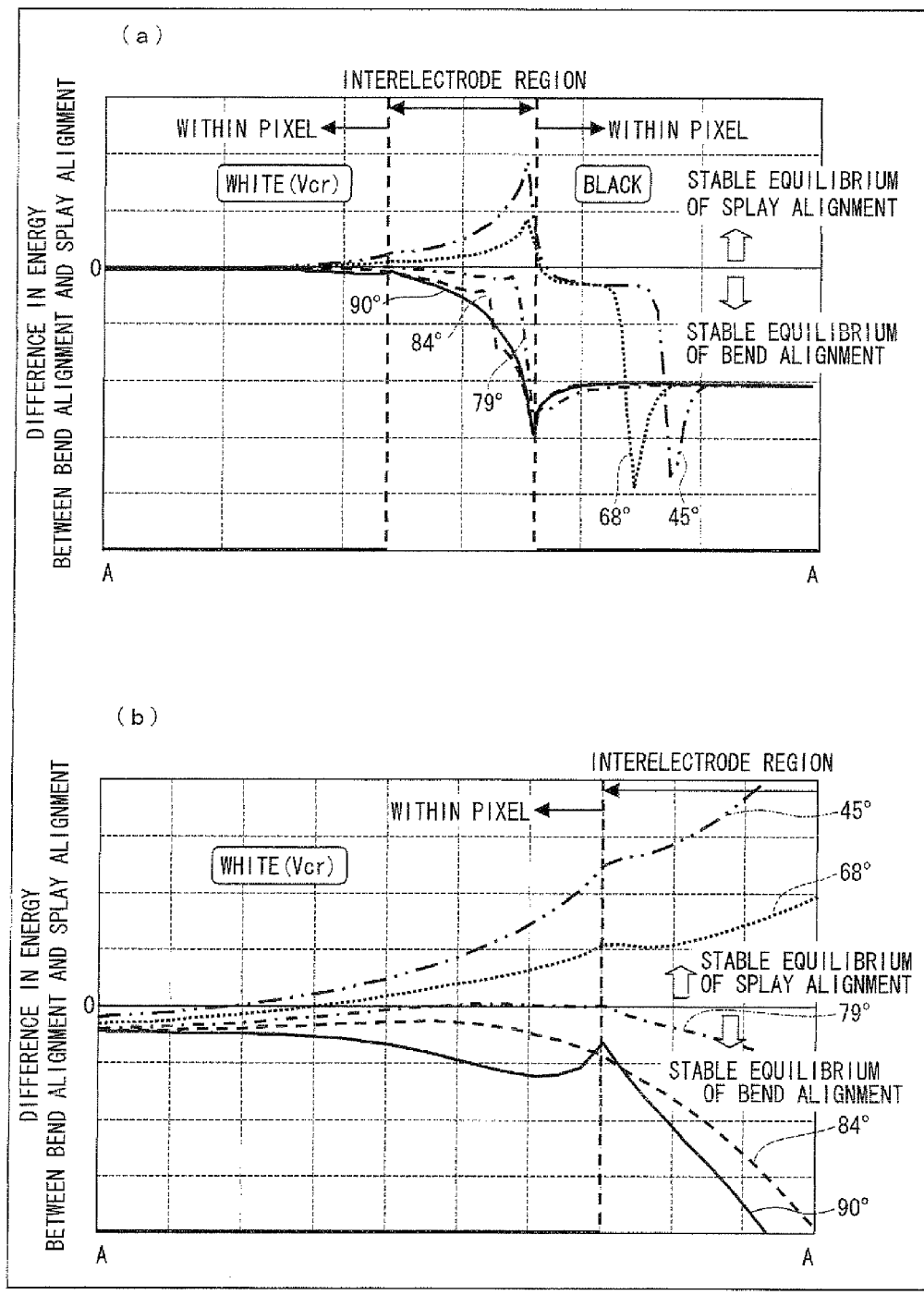

(a) and (b) of FIG. 3 show differences in energy between the bend alignment and the splay alignment. (b) of FIG. 3 is a partially enlarged view of (a) of FIG. 3.

FIG. 4

Figure 4:
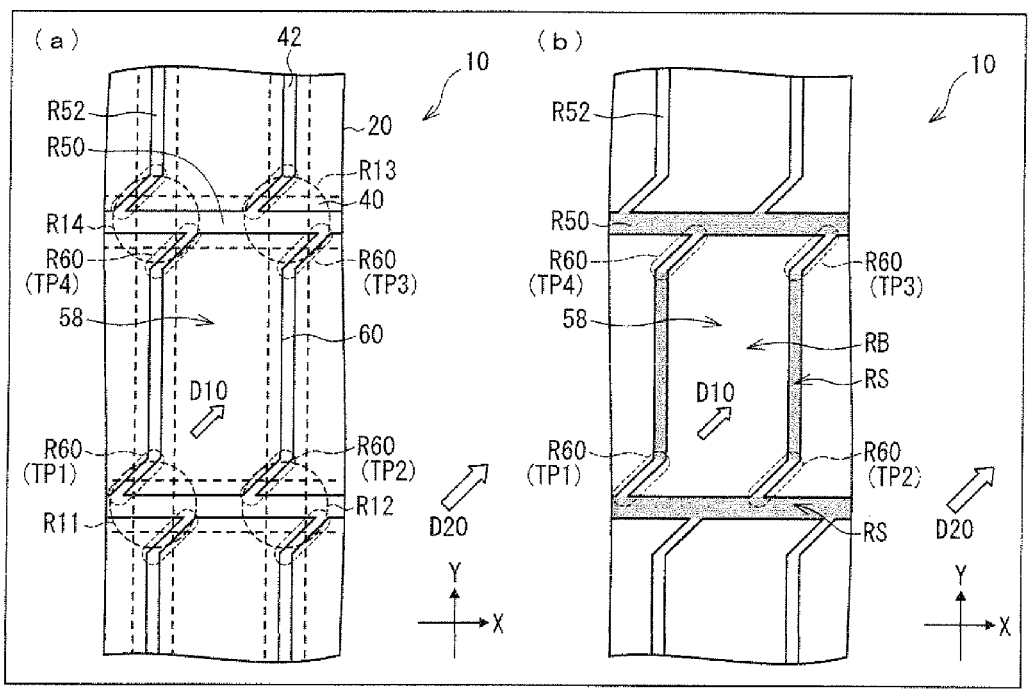

(a) and (b) of FIG. 4 show a second embodiment of the present invention. (a) of FIG. 4 schematically illustrates an arrangement of a liquid crystal display device, and (b) of FIG. 4 illustrates an alignment distribution of liquid crystal molecules.

FIG. 5

Figure 5:
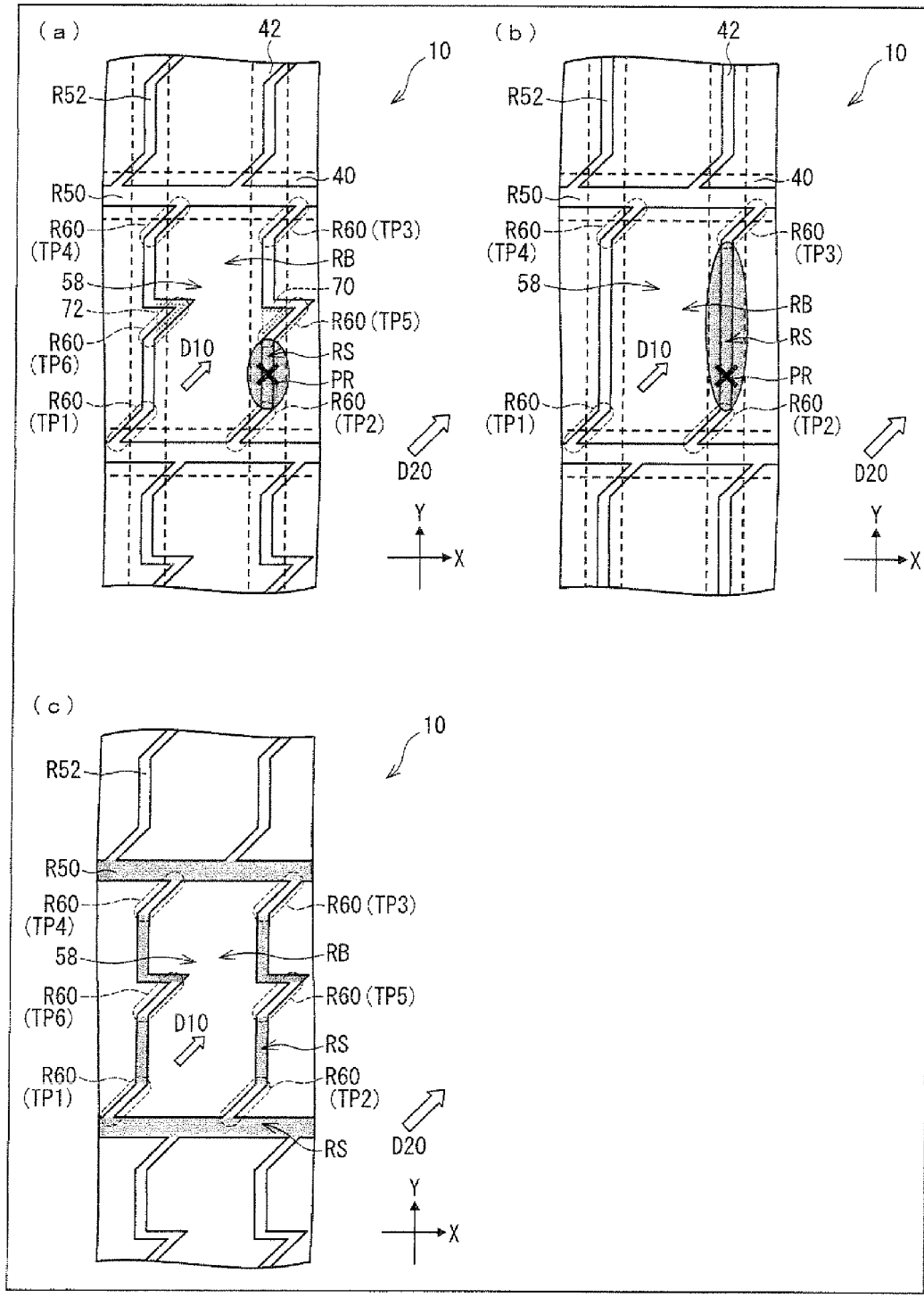

Each of (a), (b), and (c) of FIG. 5 shows a third embodiment of the present invention. (a) and (b) of FIG. 5 schematically illustrates arrangements of liquid crystal display devices, and (c) of FIG. 5 illustrates an alignment distribution of liquid crystal molecules.

FIG. 6

Figure 6:
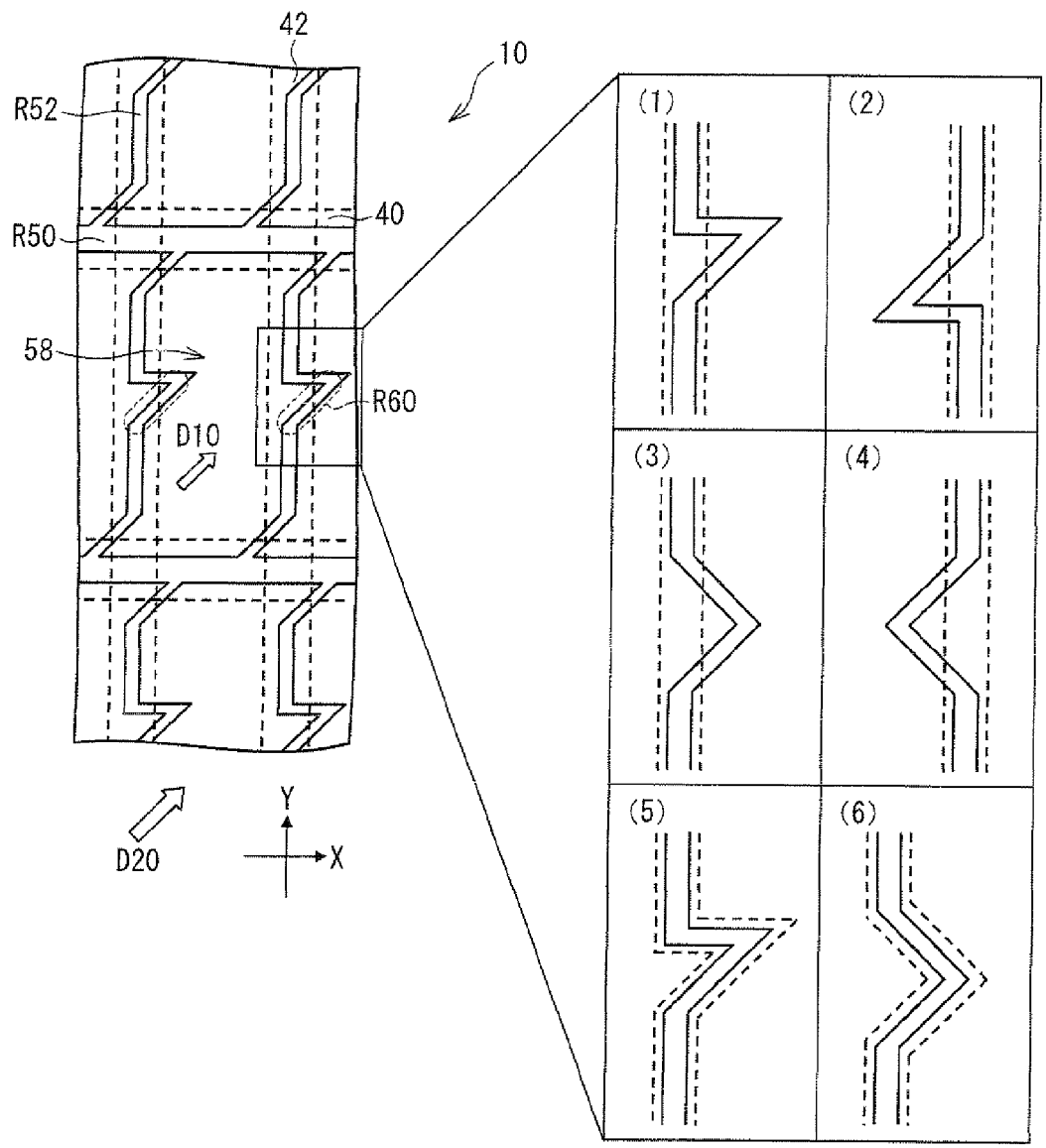

FIG. 6, which shows the third embodiment of the present invention, illustrates shapes of an alignment control region.

FIG. 7

Figure 7:
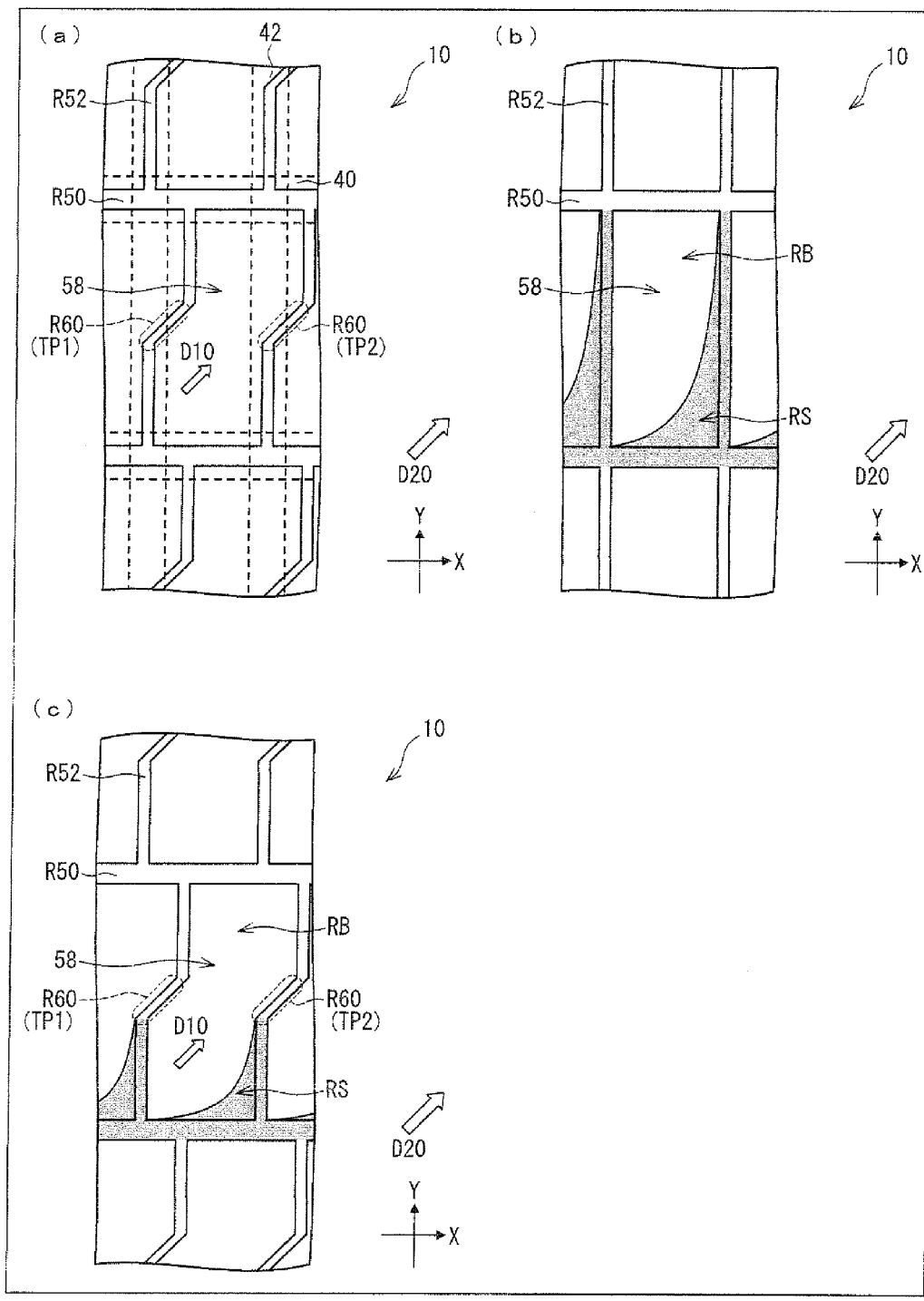

(a), (b), and (c) of FIG. 7 are drawings for explaining a fourth embodiment of the present invention. (a) of FIG. 7 schematically illustrates an arrangement of a liquid crystal display device of the fourth embodiment of the present invention, (b) of FIG. 7 illustrates an alignment distribution of liquid crystal molecules of a conventional liquid crystal display device, and (c) of FIG. 7 illustrates an alignment distribution of liquid crystal molecules of the liquid crystal display device of the fourth embodiment of the present invention.

FIG. 8

Figure 8:
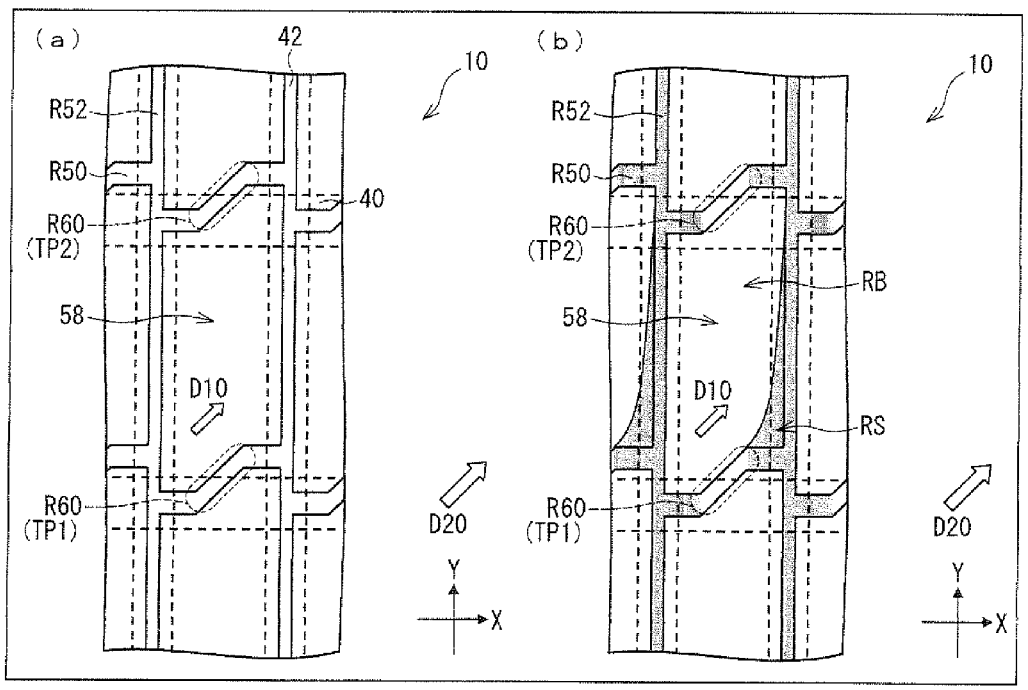

Each of (a) and (b) of FIG. 8 shows a fifth embodiment of the present invention. (a) of FIG. 8 schematically illustrates an arrangement of a liquid crystal display device, and (b) of FIG. 8 illustrates an alignment distribution of liquid crystal molecules.

FIG. 9

Figure 9:
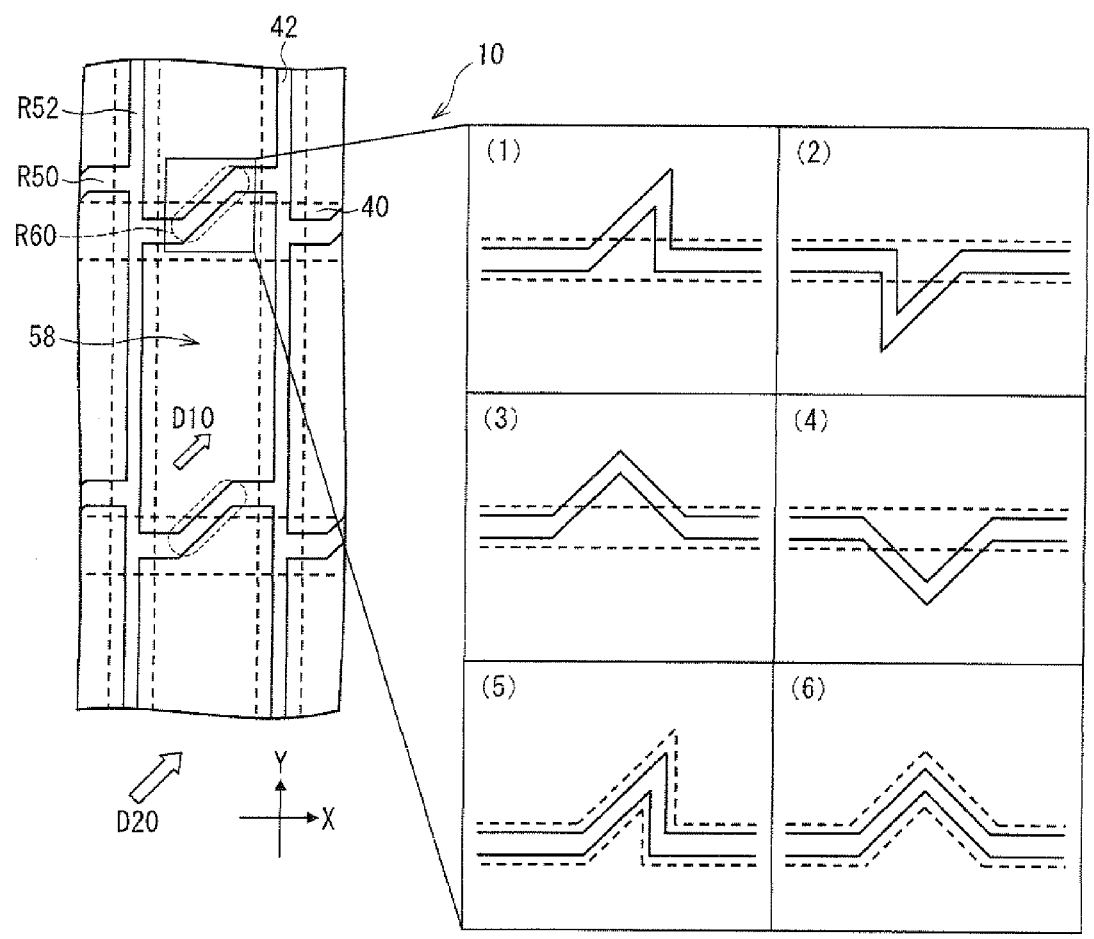

FIG. 9, which shows the fifth embodiment of the present invention, illustrates shapes of an alignment control region.

FIG. 10

Figure 10:
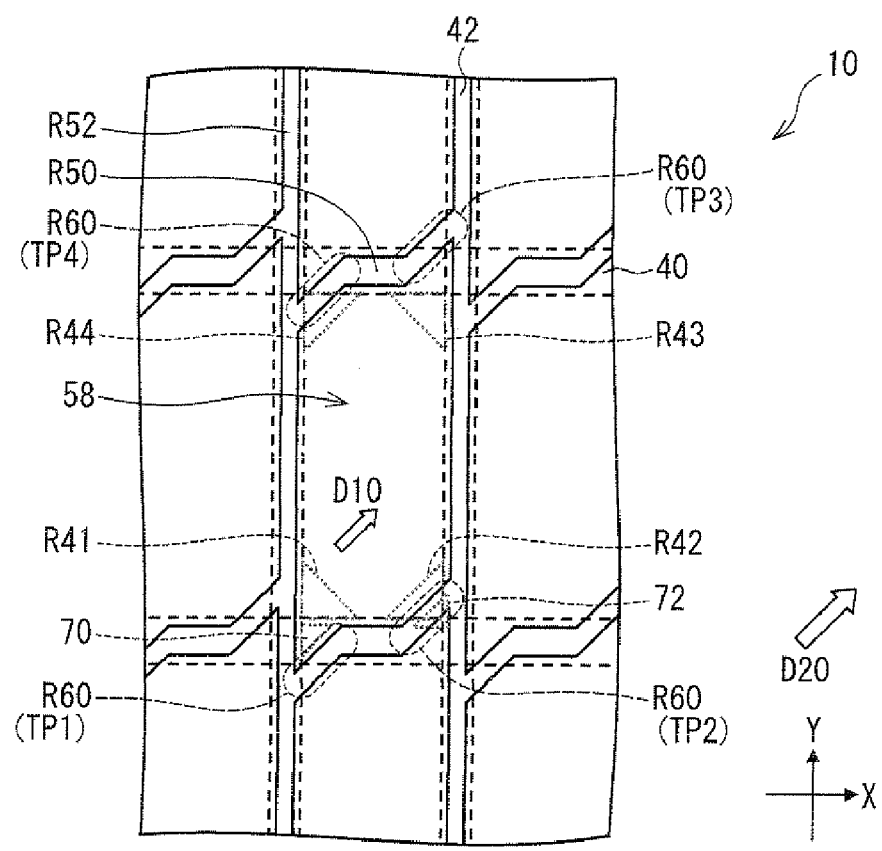

FIG. 10, which shows a sixth embodiment of the present invention, schematically illustrates an arrangement of a liquid crystal display device.

FIG. 11

Figure 11:
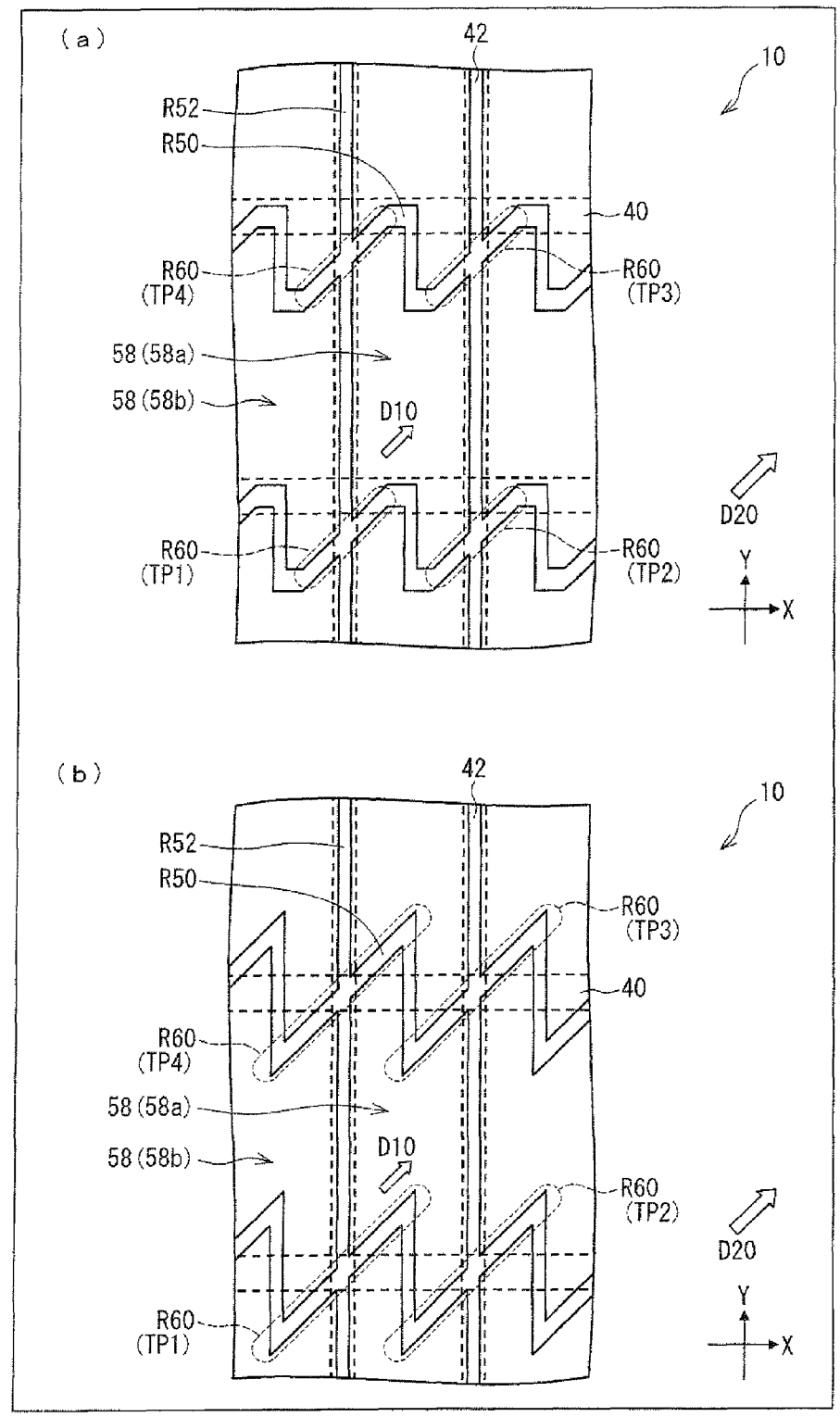

(a) and (b) of FIG. 11 schematically illustrate arrangements of liquid crystal display devices of a seventh embodiment of the present invention.

FIG. 12

Figure 12:
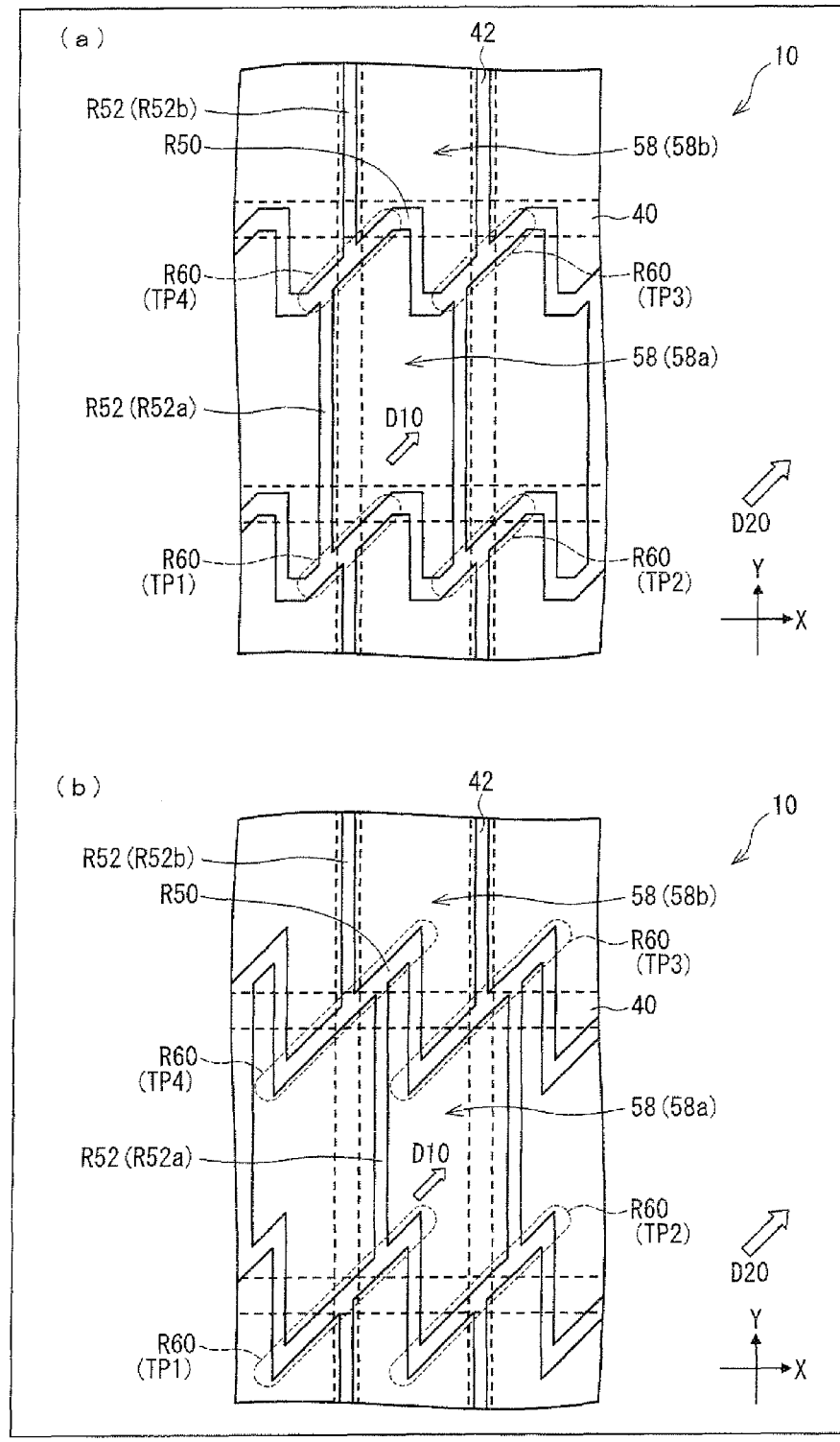

(a) and (b) of FIG. 12 schematically illustrate arrangements of liquid crystal display devices of an eighth embodiment of the present invention.

FIG. 13

Figure 13:
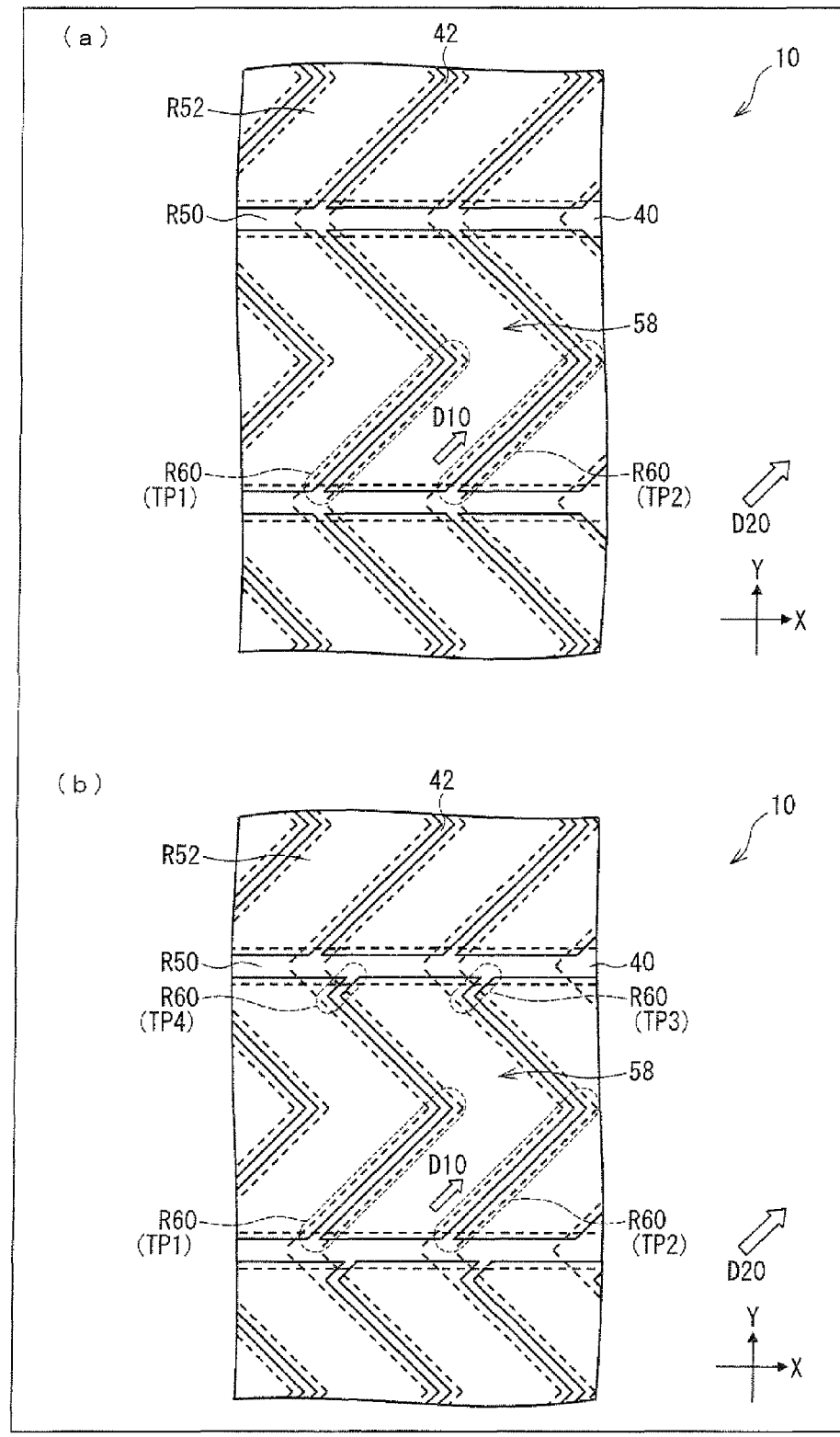

(a) and (b) of FIG. 13 schematically illustrate arrangements of liquid crystal display devices of a ninth embodiment of the present invention.

FIG. 14

Figure 14:
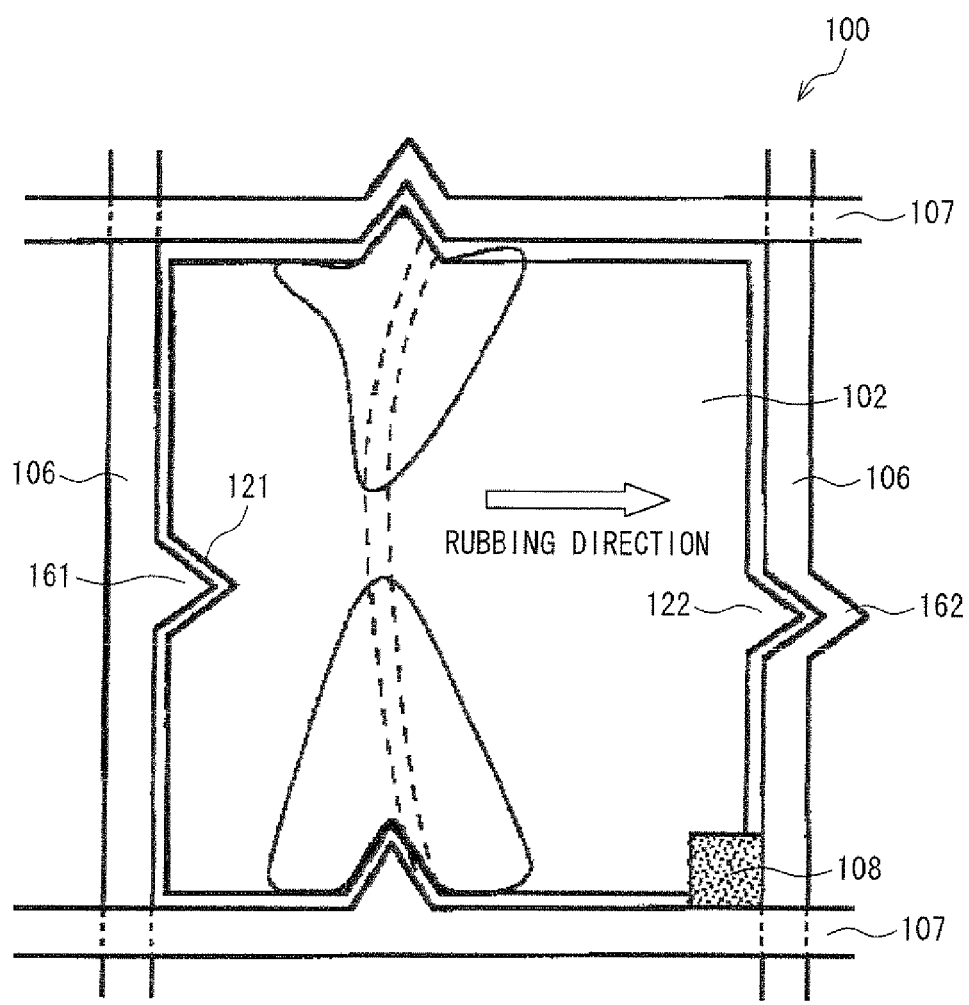

FIG. 14, which shows conventional art, schematically illustrates an arrangement of a liquid crystal display device.

FIG. 15

Figure 15:
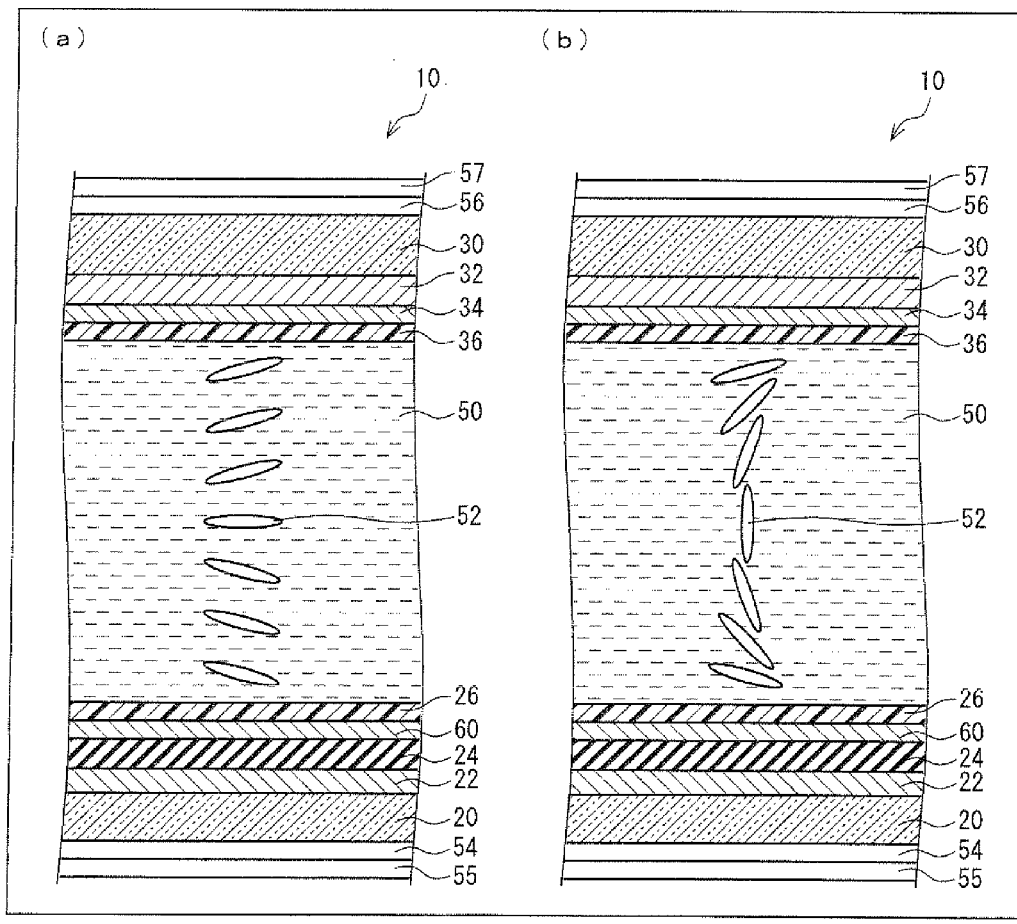

(a) and (b) of FIG. 15 are cross-sectional views each schematically illustrating an arrangement of a liquid crystal display device. (a) of FIG. 15 illustrates a splay alignment state of liquid crystal molecules, and (b) of FIG. 15 illustrates a bend alignment state of the liquid crystal molecules.

FIG. 16

Figure 16:
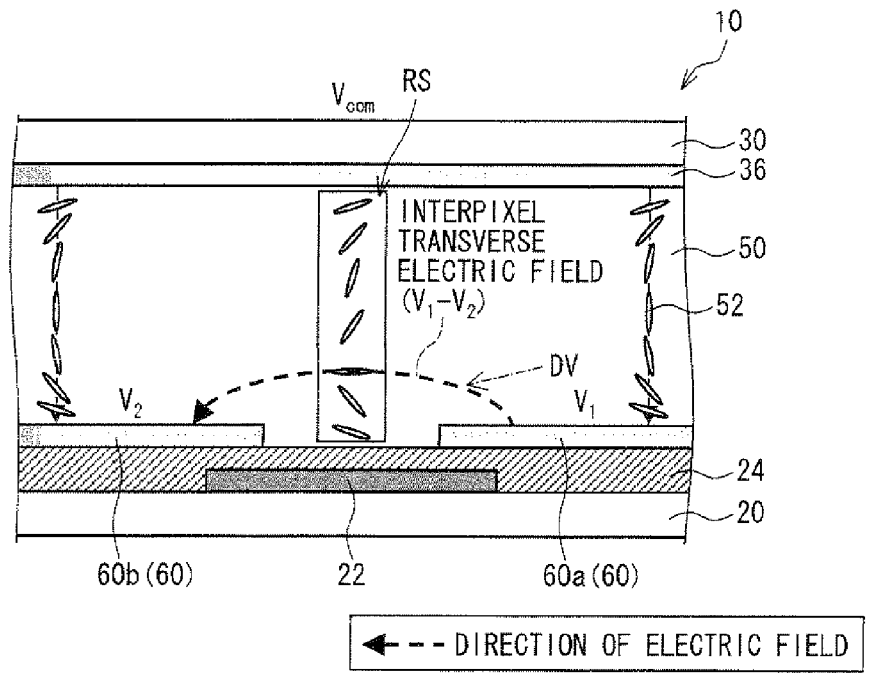

FIG. 16 is a cross-sectional view schematically illustrating an arrangement of a liquid crystal display device.

FIG. 17

Figure 17:
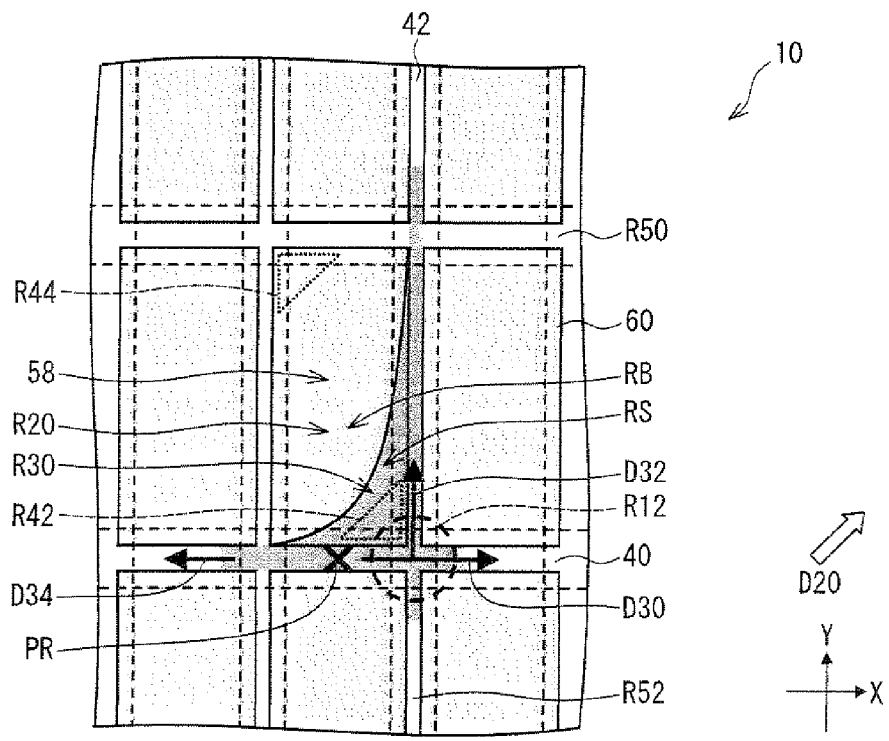

FIG. 17 schematically illustrates an arrangement of a liquid crystal display device.

FIG. 18

Figure 18:
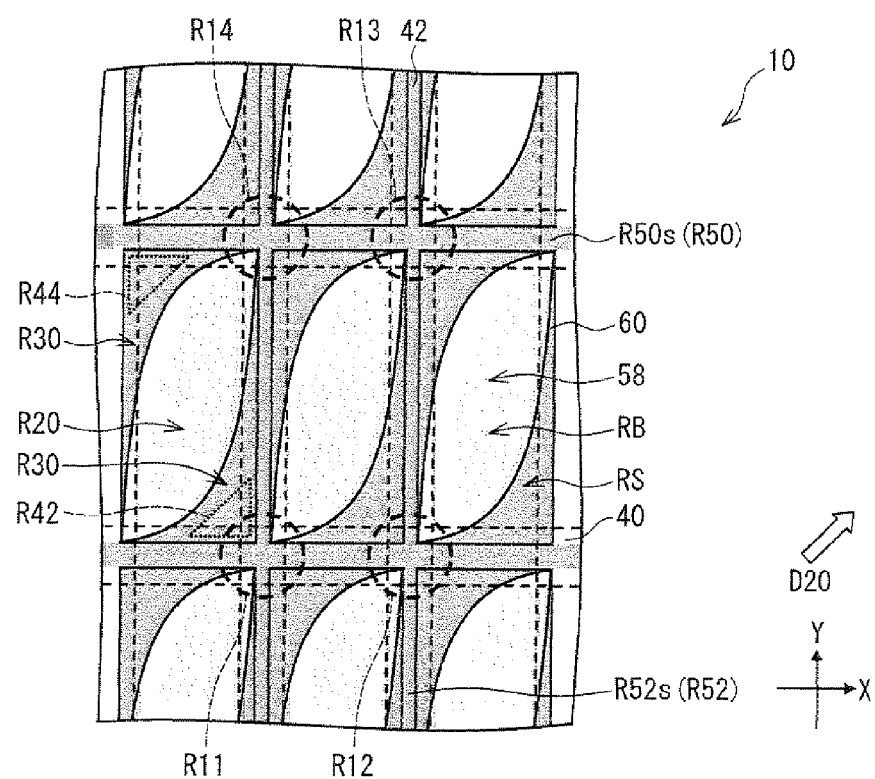

FIG. 18 schematically illustrates an arrangement of a liquid crystal display device.

REFERENCE SIGNS LIST

10 Liquid crystal display device
20 First substrate
26 First alignment film
30 Second substrate
34 Counter electrode
36 Second alignment film
40 Gate bus line
42 Source bus line
58 Pixel
60 Pixel electrode
D10 Extension direction of alignment control region
D20 Direction in which alignment treatment is carried out
PR Reverse transition occurrence point
R11-14 Intersection region
R20 Display region
R41-44 Corner part
R50 X-direction interelectrode region
R52 Y-direction interelectrode region
R60 Alignment control region
RS Splay alignment region
RB Bend alignment region

DESCRIPTION OF EMBODIMENTS

First Embodiment

The following description discusses a first embodiment of the present invention mainly with reference to (a) and (b) of FIG. 1.

(a) of FIG. 1 illustrates a shape of a pixel electrode of a liquid crystal display device of the present embodiment.

A liquid crystal display device 10 of the present embodiment has a schematic arrangement which is substantially similar to that of the liquid crystal display device 10 already described with reference to FIG. 17.

Namely, a plurality of gate bus lines 40 are provided in an arrow X direction which is a transverse direction of the liquid crystal display device 10, whereas a plurality of source bus lines 42 are provided in an arrow Y direction which is a vertical direction of the liquid crystal display device 10.

A substantially rectangular region defined by bus lines which are adjacent to each other serves as a pixel 58. A pixel electrode 60 which is substantially rectangular is provided in the pixel 58.

A switching element (not illustrated) such as a TFT (Thin Film Transistor) element is provided in a region in which a gate bus line 40 and a source bus line 42 intersect.

(Cross-Sectional Structure)

The liquid crystal display device 10 of the present embodiment has a cross-sectional structure which is substantially similar to that of the liquid crystal display device 10 described with reference to (a) of FIG. 15 and (b) of FIG. 15.

Namely, according to the liquid crystal display device 10 of the present embodiment, a liquid crystal layer 50 including liquid crystal molecules 52 is provided between a first substrate 20 and a second substrate 30 (see (a) of FIG. 15 and (b) of FIG. 15).

On the first substrate 20, (i) a wiring layer 22 which includes bus lines, switching elements, and the like, (ii) pixel electrodes 60, and (iii) a first alignment film 26 are mainly provided.

On the second substrate 30, a color filter 32, a counter electrode 34, and a second alignment film 36 are provided.

(Alignment Treatment)

Each of the first alignment film 26 and the second alignment film 36 is subjected to an alignment treatment by rubbing (a rubbing alignment treatment). As described earlier, the alignment treatment is carried out, in an identical direction, with respect to the first substrate 20 and the second substrate 30 so that the liquid crystal molecules 52 have a splay alignment during no voltage application, whereas the liquid crystal molecules 52 have a bend alignment during voltage application.

(Alignment Control Region)

The feature of the liquid crystal display device 10 resides in that an alignment control region is provided which extends in a direction having a constant relationship with a direction in which the alignment treatment is carried out. The following description describes this point with reference to (a) of FIG. 1.

According to the liquid crystal display device 10 of the present embodiment, pixels 58 are provided in a matrix pattern and pixel electrodes 60 are provided so as to correspond to the respective pixels 58.

The pixel electrodes 60 are substantially rectangular so as to correspond to the respective pixels 58 which are rectangular. Therefore, most parts of (i) an X-direction interelectrode region R50 between respective adjacent pixel electrodes 60 and (ii) a Y-direction interelectrode region R52 between respective adjacent pixel electrodes 60 linearly extend. Specifically, the X-direction interelectrode regions R50 and the Y-direction interelectrode regions R52 extend in the arrow X direction and the arrow Y direction, respectively, in which directions the pixel electrodes 58 are provided.

Note here that, according to the liquid crystal display device 10 of the present embodiment, each of the interelectrode regions, which linearly extend, has a bent part. In other words, the interelectrode region is partly bent by a partial change in shape of a pixel electrode 60 from a rectangular shape.

Specifically, it is assumed that two pixel electrodes 60, i.e., a reference pixel electrode 60a and an adjacent pixel electrode 60b, are adjacent to each other. The reference pixel electrode 60a has a protruded part 70 which protrudes from its rectangular shape. In contrast, the adjacent pixel electrode 60b has a depressed part 72 which (i) is notched from its rectangular shape and (ii) is located and shaped so as to correspond to the protruded part 70. This causes interelectrode regions, whose extension direction is different from the arrow X direction and the arrow Y direction and whose width is almost unchanged, to be provided as respective alignment control regions R60.

According to the liquid crystal display device 10 of the present embodiment, two alignment control regions R60 are provided for each pixel electrode 58. Namely, two alignment control regions are provided in respective two corner parts R41 and R42 of four corner parts R41, R42, R43, and R44 of a rectangular pixel 58.

Note that, in a case where an X coordinate corresponding to an arrow X and a Y coordinate corresponding to an arrow Y form orthogonal coordinates, (i) a corner part where the X coordinate and the Y coordinate have the respective smallest coordinate values, i.e., a lower left corner part of the rectangular shape is the corner part R41 and (ii) the other three corner parts are the corner parts R42, R43, and R44 counterclockwise in this order beginning from the corner part R41.

(Location of Alignment Control Region)

The following description discusses a relationship among (i) where the alignment control regions R60 are provided, (ii) a direction in which the alignment control regions R60 extend, and (iii) a direction in which the alignment treatment is carried out.

First, the following description discusses the direction in which the alignment treatment is carried out in the liquid crystal display device 10 of the present embodiment.

According to the present embodiment, the alignment treatment is carried out by rubbing each of the alignment films (the first alignment film 26 and the second alignment film 36). An arrow D20 (see (a) of FIG. 1) shows a direction in which the rubbing is carried out (hereinafter referred to as a rubbing direction), i.e., the direction in which the alignment treatment is carried out. Specifically, according to the present embodiment, the alignment treatment is carried out in a direction which is at an angle of 45° with the arrow X direction.

Each of the pixels 58 has alignment control regions R60 which are provided in corner parts which are first subjected to rubbing, i.e., the corner part R41 which is the lower left corner part of the rectangular shape and the corner part R42 which is adjacent to the corner part R41 in the arrow X direction (transverse direction).

(Extension Direction of Alignment Control Region)

Next, the following description discusses the extension direction of the alignment control region R60 of the present embodiment.

The alignment control region R60 of the present embodiment has the protruded part 70 provided in the reference pixel electrode 60a and the depressed part 72 provided in the adjacent pixel electrode 60b.

According to the present embodiment, the protruded part 70 and the depressed part 72 are triangular, and the extension direction of the alignment control region R60 (see an arrow D10) is a diagonal direction which is different from the arrow X direction and the arrow Y direction which are lattice directions of the matrix. Specifically, the diagonal direction is at an angle of 45° with the arrow X direction.

According to the present embodiment, the extension direction D10 of the alignment control region R60 coincides with the direction D20 in which the alignment treatment is carried out.

(Reverse Transition)

According to the arrangement, the liquid crystal display device 10 of the present embodiment can prevent a reverse transition from expanding. The following description discusses this point.

FIG. 2 illustrates a schematic arrangement of the liquid crystal display device 10, especially an arrangement of pixel electrodes 60 of the second substrate 30 and the direction in which the alignment treatment is carried out.

(a) and (b) of FIG. 3 are graphs illustrating differences in energies between the bend alignment and the splay alignment. (b) of FIG. 3 is an enlarged view of a part of (a) of FIG. 3 which part is surrounded by a dotted line. (a) and (b) of FIG. 3 illustrate the difference in energies, in a cross-section taken from the line A-A (see FIG. 2), for respective various directions D20 in each of which the alignment treatment is carried out.

According to the liquid crystal display 10 (see FIG. 2), a white display and a black display are carried out in respective adjacent pixels 58. Namely, a white voltage (a critical voltage (Vcr)) is applied to one of adjacent pixel electrodes 60 (this pixel electrode 60 is referred to as a white display pixel electrode 60c) and a black voltage is applied to the other of the adjacent pixel electrodes 60 (this pixel electrode 60 is referred to as a black display pixel electrode 60d).

In a case where (i) the arrow X direction is a 0° direction, (ii) the arrow Y direction is a 90° direction, and (iii) directions in which rubbings (the alignment treatment) are carried out are respective five directions: 45°, 68°, 79°, 84°, and 90° directions, (a) and (b) of FIG. 3 show distributions of the difference, in free energies for the respective five directions, between the bend alignment and the splay alignment. Note here that, in a case where a difference in energy is negative in a direction, a stable equilibrium of the bend alignment will be achieved in a region where the rubbing is carried out in such a direction. In contrast, in a case where a difference in energy is positive in a direction, a stable equilibrium of the splay alignment will be achieved in a region where the rubbing is carried out in such a direction.

In a case where the rubbing is carried out in a direction (at a rubbing angle) ranging from 79° to 90°, a stable equilibrium of the bend alignment will be achieved in all regions including a region between adjacent pixel electrodes (see (a) and (b) of FIG. 3).

This is because (i) the twist alignment is more likely to be induced than the splay alignment, in a region in which an electric field is generated in a direction which crosses at substantially right angles to an alignment direction of liquid crystal molecules and (ii) the twist alignment is more close to the bend alignment than to the splay alignment in terms of energy.

In a case where the rubbing is carried out at an angle of 45° or 68°, a stable equilibrium of the splay alignment will be achieved not only in a region between adjacent pixel electrodes but also inside a pixel.

As is clear from above, a transition easily occurs to the splay alignment in a case where the rubbing direction is at an angle of 45° with an extension direction of a region between pixel electrodes. In contrast, it is clear that it is possible to cause the bend alignment to be stabilized in a case where the rubbing direction is parallel to the extension direction of the interelectrode region.

This shows that provision of the interelectrode region extending in a direction substantially parallel to the rubbing direction allows (i) the reverse transition to be less likely to occur and (ii) the reverse transition to be less likely to intrude into a pixel in a case where the reverse transition occurs.

Note that (i) it is not always necessary that the rubbing direction be parallel to the extension direction of the interelectrode region and (ii) it is possible to obtain a similar effect even if the rubbing direction is shifted, by for example approximately 10°, from the extension direction of the interelectrode region (see (a) and (b) of FIG. 3).

Subsequently, the following description discusses a function of an alignment control region R60 with reference to (b) of FIG. 1. (b) of FIG. 1 illustrates an alignment distribution of liquid crystal molecules of the liquid crystal display device 10 of the present embodiment.

According to the liquid crystal display device 10 in which an alignment control region R60 is provided, even if a splay alignment region RS occurs due to the reverse transition, the splay alignment region RS is less likely to expand and then intrude into a pixel 58.

Namely, as described earlier, the splay alignment region RS easily intrudes into the pixel 58, in a case where the splay alignment region RS of the X-direction interelectrode region R50 and the splay alignment region RS of the Y-direction interelectrode region R52 are combined.

In view of the circumstances, according to the liquid crystal display device 10 of the present embodiment, alignment control regions R60 (TP1 and TP2) are provided in respective intersection regions R11 and R12 where an X-direction interelectrode region R50 and two adjacent Y-direction interelectrode regions R52 intersect.

In each of the alignment control regions R60, the extension direction D10 of the interelectrode region coincides with the direction D20 in which the alignment treatment is carried out. Namely, the extension direction D10 is parallel to the direction D20 in which the alignment treatment is carried out. Accordingly, as described earlier, in an alignment control region R60, a stable equilibrium of the bend alignment will be achieved that of the splay alignment.

Consequently, the splay alignment region RS of the X-direction interelectrode region R50 and the splay alignment region RS of the Y-direction interelectrode region R52 are difficult to be combined. This can prevent the splay alignment region RS from intruding into the pixel 58.

(High Transmittance)

According to the liquid crystal display device 10 of the present embodiment, since the splay alignment region which has occurred due to the reverse transition is difficult to intrude into the pixel 58, it is possible to set the white voltage to a low voltage. This can realize a liquid crystal display device 10 which is capable of carrying out a bright display at a high transmittance.

Second Embodiment

The following description discusses a second embodiment of the present invention with reference to (a) and (b) of FIG. 4. Note that an arrangement which is not described in the present embodiment is identical to the arrangement described in the First Embodiment. Note also that, for convenience, members having functions identical to those of the respective members illustrated in the drawings of the First Embodiment are given respective identical reference numerals, and a description of those members is omitted here.

A liquid crystal display device 10 of the present embodiment is different, in the number of alignment control regions R60 provided for a pixel, from the liquid crystal display device 10 of the First Embodiment. Specifically, according to the liquid crystal display device 10 of the First Embodiment, alignment control regions R60 are provided in two corner parts R41 and R42 of four corner parts (R41, R42, R43, and R44) of a rectangular pixel 58 which two corner parts face a single gate bus line 40. In contrast, according to the liquid crystal display device 10 of the present embodiment, alignment control regions R60 are provided in respective four corner parts (R41, R42, R43, and R44) of a rectangular pixel 58.

Namely, there is a total of four alignment control regions R60, which serve as traps (TP) for preventing expansion of a splay alignment region RS, i.e., two additional traps (TP3 and TP4) and the two traps (TP1 and TP2) of the First Embodiment.

(Dot Inversion Driving)

According to the arrangement, it is possible to prevent the splay alignment region RS from intruding into the pixel 58, not only in a case where the liquid crystal display device 10 is subjected to line inversion driving but also in a case where the liquid crystal display device 10 is subjected to dot inversion driving.

The following description discusses this point with reference to (b) of FIG. 4 which illustrates an alignment distribution of liquid crystal molecules of the liquid crystal display device 10 of the present embodiment.

As described earlier with reference to FIG. 18, the splay alignment region RS tends to intrude into the pixel 58 in a wider range in the case where the liquid crystal display device 10 is subjected to the dot inversion driving than in the case where the liquid crystal display device 10 is subjected to the line inversion driving.

This is because, according to the dot inversion driving, differently from the case of the line inversion driving, a large transverse electric field is generated also between adjacent pixel electrodes 60, between which a source bus line 42 is provided.

Then, such a large transverse electric field may cause the splay alignment region. RS to intrude into the pixel 58 via all the four corner parts (R41, R42, R43, and R44) of the pixel 58.

In view of the circumstances, according to the liquid crystal display device 10 of the present embodiment, the alignment control regions R60 serving as the traps (TP1 through TP4) are provided in all the respective four corner parts (R41, R42, R43, and R44) of the pixel 58.

Therefore, it is possible to prevent splay alignment regions RS of X-direction interelectrode regions R50 from being combined with respective splay alignment regions RS of Y-direction interelectrode regions R52 in all four intersection regions (R11 through R14) around the pixel 58 in which intersection regions the X-direction interelectrode regions R50 and the Y-direction interelectrode regions R52 intersect.

Consequently, according to the liquid crystal display device 10 of the present embodiment, it is possible to prevent the splay alignment region RS from intruding into the pixel 58 not only in the case where the liquid crystal display device 10 is subjected to line inversion driving but also in the case where the liquid crystal display device 10 is subjected to dot inversion driving.

(Photo Spacer)

As described earlier, according to the present embodiment, the alignment control regions R60 are provided in all the respective four corner parts (R41, R42, R43, and R44) of the pixel 58.

Therefore, it is possible to further reduce a range in which the reverse transition occurs, particularly in a case where a photo spacer is provided between respective adjacent pixels 58 located in vicinities of the four corners of the pixel 58. This is because it is possible to cause the alignment control regions to prevent a reverse transition although the alignment of the liquid crystal molecules are easy to disturb around a photo spacer, so that the reverse transition is easy to occur.

Third Embodiment

Next, the following description discusses a third, embodiment of the present invention with reference to (a), (b), and (c) of FIG. 5, and FIG. 6. Note that an arrangement which is not described in the present embodiment is identical to the arrangement described in each of the Embodiments. Note also that, for convenience, members having functions identical to those of the respective members illustrated in the drawings of each of the Embodiments are given respective identical reference numerals, and a description of those members is omitted here.

A liquid crystal display device 10 of the present embodiment is different, in the number of alignment control regions R60 provided for a pixel, from the liquid crystal display device 10 of the Second Embodiment. Specifically, according to the liquid crystal display device 10 of the Second Embodiment, a total of four alignment control regions R60 are provided in respective four corner parts (R41, R42, R43, and R44) of a rectangular pixel 58. In contrast, according to the liquid crystal display device 10 of the present embodiment, there are provided (i) four alignment control regions R60 provided in respective four corner parts (R41, R42, R43, and R44) of a rectangular pixel 58 and (ii) additional two alignment control regions R60.

Namely, according to the liquid crystal display device 10 of the present embodiment, in addition to the alignment control regions R60 provided in the respective four corner parts (R41, R42, R43, and R44), the additional two alignment control regions R60 are provided on long sides which are respective vertical sides of the rectangular pixel 58.

Specifically, the alignment control regions R60 are provided as traps (TP5 and TP6) in respective central parts in a longitudinal direction of two Y-direction interelectrode regions R52 defining a pixel 58.

As in the case of the alignment control regions R60 of each of the Embodiments, a protruded part and a depressed part, which are triangular and correspond to each other, are provided to respective adjacent pixel electrodes 60. This causes the alignment control regions R60 serving as the respective traps TP5 and TP6 to be provided.

Note that a shape of an alignment control region R60 is not limited to the above shape. This will be described later with reference to FIG. 6.

(Middle Part of Side of Pixel)

According to the arrangement, it is possible to securely prevent a splay alignment region RS from intruding into the pixel 58 via a middle part of a side (a central part of an outer circumferential side) of the pixel 58.

This will be described below with reference to (a) of FIG. 5, (b) of FIG. 5 which illustrates an alignment distribution of liquid crystal molecules of the liquid crystal display device 10 of the Second Embodiment, and with reference to (c) of FIG. 5 which illustrates an alignment distribution of liquid crystal molecules of the liquid crystal display device 10 of the present embodiment.

According to the arrangement in which the alignment control regions R60 are provided only in the respective four corner parts (R41, R42, R43, and R44) of the pixel 58 (see (b)

of FIG. 5), the splay alignment region RS may intrude into the pixel 58 via the middle part of the long side of the pixel 58.

For example, assume that (i) a transverse electric field is generated between adjacent pixel electrodes 60, between which a Y-direction interelectrode region R52 is provided and (ii) a splay alignment region RS has been generated due to a reverse transition which occurred, for example, at a reverse transition occurrence point PR, on a source bus line 42, where a foreign matter or the like is located.

Normally, a splay alignment region RS of the Y-direction interelectrode region R52 is prevented from expanding by two alignment control regions (R60 (TP2 and TP3) which are provided in the Y-direction interelectrode region R52 so that the splay alignment region RS is sandwiched between the two alignment control regions.

However, the splay alignment region RS may expand elliptically in an arrow X direction, for example in a case where a voltage around a critical voltage (Vcr) is applied to a pixel electrode 60. In this case, the splay alignment region RS which has expanded may intrude into the pixel 58.

In view of the circumstances, according to the liquid crystal display device 10 of the present embodiment, the alignment control regions R60 (TP5 and TP6) are further provided in middle regions of the respective long sides of source bus lines 42 of the pixel 58, in addition to the alignment control regions R60 which are provided in regions in which source bus lines 42 and gate bus lines 40 intersect.

Therefore, the splay alignment regions RS of the two Y-direction interelectrode regions R52 are subdivided by the traps (TP1 through TP6), as shown in (a) and (c) of FIG. 5. This can further prevent (1) the splay alignment region RS from expanding and (ii) the splay alignment region RS from intruding into the pixel 58.

(Other Shapes)

Note that shapes of the alignment control regions R60 provided in the middle regions of the respective long sides are not limited to the embodiment illustrated in (a) of FIG. 5. The alignment control regions R60 can have various shapes.

FIG. 6 gives examples of various shapes of the alignment control regions.

Note that it is possible to bend a bus line such as a source bus line 42 by causing the bus line to correspond to a bend (a trap shape) of an interelectrode region (see (5) and (6) of FIG. 6).

Note also that the number of alignment control regions R60 provided in a middle part of one long side of the pixel 58 is not limited to one. Instead, it is also possible to provide a plurality of alignment control regions R60 for one long side.

Note that the above description discussed the arrangement in which an alignment control region R60 is provided in a middle part of a long side of the pixel 58 along a source bus line 42 (a side of the pixel 58 which side corresponds to the Y-direction interelectrode region R52). Instead, it is possible to provide the alignment control region R60 in a middle part of a short side of the pixel 58 along a gate bus line 40 (a side of the pixel 58 which side corresponds to an X-direction interelectrode region R50).

Fourth Embodiment

Next, the following description discusses a fourth embodiment of the present invention with reference to (a), (b), and (c) of FIG. 7. Note here that (a) of FIG. 7 schematically illustrates an arrangement of a liquid crystal display device 10 of the present embodiment.

Note that an arrangement which is not described in the present embodiment is identical to the arrangement described in each of the Embodiments. Note also that, for convenience, members having functions identical to those of the respective members illustrated in the drawings of each of the Embodiments are given respective identical reference numerals, and a description of those members is omitted here.

A liquid crystal display device 10 of the present embodiment is equivalent to the liquid crystal display device 10 of the Third Embodiment in that alignment control regions R60 are provided in middle parts of respective long sides of a pixel 58. However, the alignment control regions R60 have a different shape from the alignment control regions R60 of the Third Embodiment.

Namely, according to the liquid crystal display device 10 of the Third Embodiment, for example, a protruded part and a depressed part 72 which corresponds to the protruded part 70 are provided to respective adjacent pixel electrodes 60. This causes the alignment control regions R60 to be provided (see (a) of FIG. 5).

In contrast, according to the liquid crystal display device 10 of the present embodiment, a Y-direction interelectrode region R52 has a bent part which is prepared by partially bending the Y-direction interelectrode region R52 so that the bent part extends parallel to a direction D20 in which an alignment treatment is carried out. The bent part serves as the alignment control region R60 (see (a) of FIG. 7).

Namely, the Y-direction interelectrode region R52 has the alignment control region R60 (i) which is provided in the middle part of the long side of the pixel 58 (see the Third Embodiment) and (ii) which is defined by two sides each of which extends in a direction different from, for example, an arrow Y direction in which the pixels 58 are provided.

In contrast, according to the present embodiment, the Y-direction interelectrode region R52 has the alignment control region R60 defined by a single side which extends in the direction different from the arrow Y direction. Thus, the alignment control region R60 of the present embodiment is simply arranged.

(Middle Part of Side of Pixel)

Such an arrangement can prevent a splay alignment region RS from intruding into the pixel 58 via, for example, a corner part of the pixel 58. This is described below with reference to (b) of FIG. 7 and (c) of FIG. 7. (b) of FIG. 7 and (c) of FIG. 7 illustrate alignment distributions of liquid crystal molecules. (b) of FIG. 7 illustrates the alignment distribution of liquid crystal molecules of a conventional, liquid crystal display device, and (c) of FIG. 7 illustrates the alignment distribution of liquid crystal molecules of the liquid crystal display device of the present embodiment.

The splay alignment region RS easily intrudes into the pixel 58 (see (b) of FIG. 7), in a case where a combination of a splay alignment region RS of an X-direction interelectrode region R50 and a splay alignment region RS of a Y-direction interelectrode region R52 in a corner part of a pixel 58 causes the splay alignment region RS to further expand.

In view of the circumstances, according to the present embodiment, the alignment control regions R60 (TP1 and TP2) are provided in middle regions of the respective long sides of the pixel 58 in Y-direction interelectrode regions R52. Each of the alignment control regions R60 has an interelectrode region whose extension direction D10 is parallel to the direction D20 in which the alignment treatment is carried out.

This causes the alignment control regions R60 to easily prevent the splay alignment region RS from expanding. Therefore, (i) the splay alignment region RS of the X-direction interelectrode region R50 and (ii) the splay alignment region RS of the Y-direction interelectrode region R52 are difficult to combine. In addition, even if the above (i) and (ii) are combined, it is possible to prevent their expansion.

This can prevent the splay alignment region RS from intruding into the pixel 58.

Note that, in order to clarify a feature of the liquid crystal display device 10 of the present embodiment, (a) of FIG. 7, (b) of FIG. 7, and (c) of FIG. 7 illustrate the arrangements in which the alignment control regions R60 are provided only in the middle parts of the respective long sides of the pixel 58. Note, however, that the liquid crystal display device 10 of the present embodiment is not limited to such a specific arrangement. In addition to the alignment control regions R60 provided in the middle parts of the respective long sides of the pixel 58, it is possible to further provide, in corner parts of the pixel 58, respective alignment control regions R60 as in the case of, for example, the First Embodiment.

Fifth Embodiment

Next, the following description discusses a fifth embodiment of the present invention with reference to (a) and (b) of FIG. 8. Note here that (a) of FIG. 8 schematically illustrates an arrangement of a liquid crystal display device 10 of the present embodiment.

Note that an arrangement which is not described in the present embodiment is identical to the arrangement described in each of the Embodiments. Note also that, for convenience, members having functions identical to those of the respective members illustrated in the drawings of each of the Embodiments are given respective identical reference numerals, and a description of those members is omitted here.

A liquid crystal display device 10 of the present embodiment is equivalent to the liquid crystal display device 10 of the Fourth Embodiment in that alignment control regions R60 are provided in middle parts of respective long sides of a pixel 58. However, the Fifth Embodiment differs from the Fourth Embodiment in that the alignment control regions R60 are provided in which sides of the pixel 58.

Namely, according to the liquid crystal display device 10 of the Fourth Embodiment, the alignment control regions R60 are provided in middle parts of respective vertical sides (long sides) of the pixel 58 which is rectangular. In contrast, according to the present embodiment, the alignment control regions R60 are provided in middle parts of respective transverse sides (short sides) of a pixel 58. Namely, the alignment control regions R60 (TP1 and TP2) are provided in respective two X-direction interelectrode regions R50 each of which faces the pixel 58.

According to the arrangement, the alignment control regions R60 each of which extension directions D10 is parallel to a direction D20 in which an alignment treatment is carried out easily prevent a splay alignment region RS from expanding, as in the case of the liquid crystal display device 10 of the Fourth Embodiment.

This can prevent the splay alignment region RS from intruding into the pixel 58.

Note that, in order to clarify a feature of the liquid crystal display device 10 of the present embodiment, (a) of FIG. 8 and (b) of FIG. 8 illustrate the arrangements in which the alignment control regions R60 are provided only in the middle parts of the respective long sides of the pixels 58. Note, however, that the liquid crystal display device 10 of the present embodiment is not limited to such a specific arrangement. In addition to the alignment control regions R60 provided in the middle parts of the respective long sides of the pixel 58, it is possible to further provide, in corner parts of the pixel 58, respective alignment control regions R60 as in the case of, for example, the First Embodiment.

(Other Shapes)

Note that shapes of the alignment control regions R60 provided in the middle regions of the respective long sides are not limited to the embodiment illustrated in (a) of FIG. 8. The alignment control regions R60 can have various shapes.

FIG. 9 gives examples of various shapes of the alignment control regions.

Note that it is possible to bend a bus line such as a gate bus line 40 by causing the bus line to correspond to a bend (a trap shape) of an interelectrode region (see (5) and (6) of FIG. 9).

Note also that the number of alignment control regions R60 provided in a middle part of one long side of the pixel 58 is not limited to one. Instead, it is also possible to provide a plurality of alignment control regions R60 for one long side.

Sixth Embodiment

Next, the following description discusses a sixth embodiment of the present invention with reference to FIG. 10. Note here that FIG. 10 schematically illustrates an arrangement of a liquid crystal display device 10 of the present embodiment.

Note that an arrangement which is not described in the present embodiment is identical to the arrangement described in each of the Embodiments. Note also that, for convenience, members having functions identical to those of the respective members illustrated in the drawings of each of the Embodiments are given respective identical reference numerals, and a description of those members is omitted here.

A liquid crystal display device 10 of the present embodiment is equivalent to the liquid crystal display device 10 of the First Embodiment in that a protruded part 70 and a depressed part 72 which are triangular are provided to respective adjacent pixel electrodes 60. This causes the alignment control regions R60 to be provided in respective four corner parts (R41, R42, R43, and R45) of a pixel 58.

However, the alignment control regions R60 of the present embodiment are provided through use of a gap between respective pixel electrodes provided above a gate bus line 40. In contrast, the alignment control regions R60 of the First Embodiment are provided mainly through use of a gap between respective pixel electrodes 60 provided above a source bus line 42. In this regard, the present embodiment is different from the First Embodiment.

Namely, the alignment control regions R60 of the First Embodiment are provided in the Y-direction interelectrode regions R52, whereas the alignment control regions R60 of the present embodiment are provided in X-direction interelectrode regions R50.

Specifically, a protruded part 70 of a first pixel electrode 60 in an alignment control region R60 of the First Embodiment protrudes toward a second pixel electrode 60 which is adjacent to the first pixel electrode 60 so that a source bus line 42 is provided between the first and second pixel electrodes 60. Whereas, a protruded part 70 of a first pixel electrode 60 in an alignment control region R60 of the present embodiment protrudes toward a second pixel electrode 60 which is adjacent to the first pixel electrode 60 so that a gate bus line 40 is provided between the first and second pixel electrodes 60.

The liquid crystal display device 10 of the present embodiment also brings about an effect of preventing a splay alignment region RS from intruding into the pixel 58, which is similar to the liquid crystal display device 10 of the First Embodiment.

Seventh Embodiment

Next, the following description discusses a seventh embodiment of the present invention with reference to (a) and (b) of FIG. 11. Note here that (a) and (b) of FIG. 11 schematically illustrate arrangements of liquid crystal display devices 10 of the present embodiment.

Note that an arrangement which is not described in the present embodiment is identical to the arrangement described in each of the Embodiments. Note also that, for convenience, members having functions identical to those of the respective members illustrated in the drawings of each of the Embodiments are given respective identical reference numerals, and a description of those members is omitted here.

A liquid crystal display device 10 of the present embodiment is similar to the liquid crystal display device 10 of the First Embodiment in that alignment control regions R60 are provided in respective four corner parts of a pixel 58.

Note, however, that a feature of the liquid crystal display device 10 of the present embodiment resides in that an alignment control region 160 of a pixel 58 (a pixel 58a) extends to a pixel 58b which is adjacent to the pixel 58a.

Namely, according to the liquid crystal display devices 10 as illustrated in (a) of FIG. 11 and (b) of FIG. 11, for example, an X-direction interelectrode region R50 of an alignment control region R60 serving as a TP (trap) 4 is arranged in a single straight line in transversely adjacent pixels 58 (58a and 58b).

According to the arrangement, the alignment control regions R60 serving as splay traps are extensively provided in the corner parts of the pixel 58. This can effectively prevent the reverse transition from occurring particularly in the corner parts of the pixel 58.

Eighth Embodiment

Next, the following description discusses an eighth embodiment of the present invention with reference to (a) and (b) of FIG. 12. Note here that (a) and (b) of FIG. 12 schematically illustrate arrangements of liquid crystal display devices 10 of the present embodiment.

Note that an arrangement which is not described in the present embodiment is identical to the arrangement described in each of the Embodiments. Note also that, for convenience, members having functions identical to those of the respective members illustrated in the drawings of each of the Embodiments are given respective identical reference numerals, and a description of those members is omitted here.

A liquid crystal display device 10 of the present embodiment is similar to the liquid crystal display device 10 of the Seventh Embodiment in that an alignment control region R60 of a pixel 58 (a pixel 58a) extends to a pixel 58b which is adjacent to the pixel 58a.

Note, however, that a feature of the liquid crystal display device 10 of the present embodiment resides in that interelectrode regions, which intersect an interelectrode region in which an alignment control region R60 is provided, are not provided to extend on a single straight line.

Namely, according to the liquid crystal display devices illustrated in (a) of FIG. 12 and (b) of FIG. 12, an alignment control region R60 is provided in an X-direction interelectrode region R50. A Y-direction interelectrode region R52, which intersects the X-direction interelectrode region R50 in which the alignment control region R60 is provided, is not arranged in a single straight line in vertically adjacent pixels 58.

Specifically, a Y-direction interelectrode region R52a of a pixel 58a and a Y-direction interelectrode region R52b of a pixel 58b are not arranged in a single straight line and are therefore displaced in an arrow X direction. Note that (i) a pixel 58a and a pixel 58b are arranged adjacent to each other and (ii) a gate bus line 40 is provided between them.

According to the arrangement, it is possible to prevent a splay alignment region RS from being spread beyond a bus line such as a source bus line 42.

Namely, according to the arrangements illustrated in (a) of FIG. 12 and (b) of FIG. 12, a source bus line 42 and a Y-direction interelectrode region R52 do not extend in a single straight line, and therefore the source bus line 42 and the Y-direction interelectrode region R52 are displaced in a corresponding alignment control region R60.

This causes the alignment control region R60 to easily prevent the splay alignment region RS of the source bus line 42 from expanding. Accordingly, it is possible to prevent the splay alignment region RS from intruding into the pixel 58.

Ninth Embodiment

Next, the following description discusses a ninth embodiment of the present invention with reference to (a) and (b) of FIG. 13. Note here that (a) and (b) of FIG. 13 schematically illustrate arrangements of liquid crystal display devices 10 of the present embodiment.

Note that an arrangement which is not described in the present embodiment is identical to the arrangement described in each of the Embodiments. Note also that, for convenience, members having functions identical to those of the respective members illustrated in the drawings of each of the Embodiments are given respective identical reference numerals, and a description of those members is omitted here.

A liquid crystal display device 10 of the present embodiment has a feature in which each pixel 58 as a whole is provided so as to be dogleg, i.e., v-shaped.

Namely, two Y-direction interelectrode regions R52 defining a pixel 58 are provided so as to be dogleg (V-shaped) and parallel to each other (see (a) of FIG. 13).

An extension direction D 10 of diagonal line parts (Y-direction interelectrode regions R52) of a dogleg (V-shape) which serve as alignment control regions R60 (TP1 and TP2) is parallel to a direction D20 in which an alignment treatment is carried out.

According to the liquid crystal display device 10 illustrated in (b) of FIG. 13, Y-direction interelectrode regions R52 which extend in the direction parallel to the direction D20 are provided in respective corner parts defined by diagonal lines of the dogleg which extend in a direction which is not parallel to the direction D20. This causes two additional alignment control regions R60 (TP3 and TP4) to be provided.

Therefore, due to a dogleg-like (V-shaped) pixel 58 in its entirety, it is possible to provide alignment control regions R60 in respective four corner parts of the pixel 58.

According to the liquid crystal display device 10 of the present embodiment, since each pixel 58 as a whole is arranged to be dogleg (V-shaped), it is possible to enlarge the alignment control regions R60 serving as splay traps. Technically, it is possible to (1) cause not less than half of sides of the pixel 58 to serve as the alignment control regions R60. With the arrangement, it is possible to more securely prevent a splay alignment region RS from expanding.

According to the arrangement, since it is unnecessary to provide a minute protruded part and a minute depressed part in the pixel 58 so as to provide an alignment control region, it is possible to more extensively provide alignment control regions while preventing a decrease in aperture ratio.

Note that the above description discussed the arrangement in which a dogleg (V-shape) is formed by use of a Y-direction interelectrode region. However, an arrangement of the liquid crystal display device of the present embodiment is not limited to such a specific arrangement. Instead, it is possible to form a dogleg (V-shape) by use of an X-direction interelectrode region.

Note also that a shape of a pixel is not limited to a dogleg (V-shape). For example, it is possible to cause the pixel to have another shape, such as a W shape, in which a plurality of doglegs (V-shapes) are connected in series.

Note that the description of each of the Embodiments discusses a case in which an extension direction D10 of an alignment control region and a direction D20 in which an alignment treatment is carried out are parallel to each other (i.e., the direction D10 is at an angle of 0° with the direction D20.).

Note, however, that the present invention is not limited to such a specific case where the direction D10 is at an angle of 0° with the direction D20.

For example, it is possible to set such an angle to not less than −15° and not more than +15°, as described earlier with reference to, for example, (b) of FIG. 3.

Alternatively, it is possible to set such an angle to preferably not less than −10° and not more than +10°, and more preferably not less than −5° and not more than +5°.

Note that the description of each of the Embodiments discusses a case in which the direction, in which the alignment treatment is carried out, is at an angle of 45° with the arrow X. However, an angle at which the alignment treatment is carried out is not limited to 45°. For example, it is possible to set the direction in which the alignment treatment is carried out so that the direction is at an angle of not less than −40° and not more than +50° with a direction in which pixels are provided.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

Since the present invention can prevent a deterioration in display quality due to a reverse transition, it is suitably applicable to a liquid crystal display device which is required to carry out a high-quality display, particularly to a liquid crystal display device for use in a mobile.

The invention claimed is:

1. An OCB liquid crystal display device comprising:
a first substrate;
a second substrate; and
a liquid crystal layer provided between the first substrate and the second substrate,
pixels being provided in a matrix pattern,
pixel electrodes being provided on the first substrate so as to correspond to the respective pixels,
a counter electrode being provided on the second substrate,
liquid crystal molecules of the liquid crystal layer having a splay alignment in a state where no voltage is applied to the liquid crystal layer, and a transition occurring to a bend alignment from the splay alignment in response to application of a voltage to the liquid crystal layer,
the first substrate being subjected to an alignment treatment for controlling an alignment direction of the liquid crystal molecules of the liquid crystal layer,
an alignment control region being provided in at least a part of a region between respective adjacent pixel electrodes,
an extension direction of the alignment control region being at an angle of not less than −15° and not more than +15° with a direction in which the alignment treatment is carried out,
wherein each of the pixels is rectangular, and
wherein the alignment control region is provided, in at least one corner part of said each of the pixels, between a pixel electrode corresponding to said each of the pixels and a pixel electrode which is adjacent to the pixel electrode corresponding to said each of the pixels.

2. The OCB liquid crystal display device as set forth in claim 1, wherein the extension direction of the alignment control region is at an angle of not less than −10° and not more than +10° with the direction in which the alignment treatment is carried out.

3. The OCB liquid crystal display device as set forth in claim 1, wherein the extension direction of the alignment control region is at an angle of not less than −5° and not more than +5° with the direction in which the alignment treatment is carried out.

4. The OCB liquid crystal display device as set forth in claim 1, wherein the extension direction of the alignment control region is identical to the direction in which the alignment treatment is carried out.

5. The OCB liquid crystal display device as set forth in claim 1, wherein the alignment control region includes alignment control regions which are provided, in at least two adjacent corner parts of said each of the pixels, between the pixel electrode corresponding to said each of the pixels and the pixel electrode which is adjacent to the pixel electrode corresponding to said each of the pixels.

6. The OCB liquid crystal display device as set forth in claim 1, wherein the alignment control region includes alignment control regions which are provided, in four corner parts of said each of the pixels, between the pixel electrode corresponding to said each of the pixels and the pixel electrode which is adjacent to the pixel electrode corresponding to said each of the pixels.

7. The OCB liquid crystal display device as set forth in claim 1, wherein the alignment control region is further provided, in a central part of at least one outer circumferential side of said each of the pixels, between the pixel electrode corresponding to said each of the pixels and the pixel electrode which is adjacent to the pixel electrode corresponding to said each of the pixels.

8. The OCB liquid crystal display device as set forth in claim 1, wherein the alignment treatment is a rubbing alignment treatment.

9. The OCB liquid crystal display device as set forth in claim 1, wherein the direction in which the alignment treatment is carried out is at an angle of not less than +40° and not more than +50° with a direction in which the pixels are provided in the matrix pattern.

10. The OCB liquid crystal display device as set forth in claim 1, wherein:
the alignment treatment is a rubbing alignment treatment;
the direction in which the alignment treatment is carried out is at an angle of not less than +40° and not more than +50° with a direction in which the pixels are provided in the matrix pattern;
each of the pixels is rectangular; and the alignment control region is provided, in at least a corner part of said each of the pixels which corner part is first subjected to the rubbing alignment treatment, between a pixel electrode corresponding to said each of the pixels and a pixel electrode which is adjacent to the pixel electrode corresponding to said each of the pixels.

11. The OCB liquid crystal display device as set forth in claim 1, wherein an electric field is generated between adjacent pixel electrodes, in the alignment control region, in a direction which is at an angle of not less than $-75°$ and not more than $+75°$ with the alignment direction of the liquid crystal molecules, in response to application of a voltage to the liquid crystal layer.

12. The OCB liquid crystal display device as set forth in claim 1, wherein an electric field is generated between adjacent pixel electrodes, in the alignment control region, in a direction which crosses at substantially right angles to the alignment direction of the liquid crystal molecules, in response to application of a voltage to the liquid crystal layer.

* * * * *